US011756028B2

(12) United States Patent
Shukla et al.

(10) Patent No.: US 11,756,028 B2
(45) Date of Patent: Sep. 12, 2023

(54) METHOD, SYSTEM, AND COMPUTER PROGRAM PRODUCT FOR PROVISIONING A TOKEN BASED ON MEDIA CONTENT

(71) Applicant: Visa International Service Association, San Francisco, CA (US)

(72) Inventors: Vaibhav Shukla, Bangalore (IN); Sindhu Shankar Rao, Bangalore (IN)

(73) Assignee: Visa International Service Association, San Francisco, CA (US)

(*) Notice: Subject to any disclaimer, the term of this patent is extended or adjusted under 35 U.S.C. 154(b) by 187 days.

(21) Appl. No.: 16/697,861

(22) Filed: Nov. 27, 2019

(65) Prior Publication Data
US 2021/0158336 A1    May 27, 2021

(51) Int. Cl.
*G06Q 20/36* (2012.01)
*G06Q 20/32* (2012.01)
*G06Q 30/0207* (2023.01)

(52) U.S. Cl.
CPC ..... *G06Q 20/3672* (2013.01); *G06Q 20/3224* (2013.01); *G06Q 20/3674* (2013.01); *G06Q 20/3678* (2013.01); *G06Q 30/0212* (2013.01)

(58) Field of Classification Search
None
See application file for complete search history.

(56) References Cited

U.S. PATENT DOCUMENTS

| | | | | |
|---|---|---|---|---|
| 5,943,423 A | * | 8/1999 | Muftic | G06Q 20/3674 |
| | | | | 705/67 |
| 2002/0049967 A1 | * | 4/2002 | Haseltine | G06Q 30/0241 |
| | | | | 705/14.4 |
| 2009/0327057 A1 | * | 12/2009 | Redlich | G06Q 30/0218 |
| | | | | 705/14.2 |
| 2012/0330734 A1 | * | 12/2012 | Brown | G06Q 30/02 |
| | | | | 705/14.5 |
| 2013/0218710 A1 | * | 8/2013 | Golden | H04W 4/029 |
| | | | | 705/26.3 |
| 2014/0188590 A1 | * | 7/2014 | Anguiano | G06Q 30/02 |
| | | | | 705/14.35 |

(Continued)

FOREIGN PATENT DOCUMENTS

WO    WO-2018176053 A1 *  9/2018   ....... G06F 17/30979

OTHER PUBLICATIONS

Nguyen, K. et al., "A Privacy-Preserving, Accountable and Spam-Resilient Geo-Marketplace", Sigspatial '19, Nov. 5-8, 2019. (Year: 2019).*

*Primary Examiner* — Neha Patel
*Assistant Examiner* — Clay C Lee
(74) *Attorney, Agent, or Firm* — THE WEBB LAW FIRM

(57) ABSTRACT

A method for provisioning a token based on media content may include receiving media content data associated with media content, account identifier data associated with an account identifier of a first user, and first user device identification data associated with a first user device of the first user. Keyword data associated with at least one keyword may be extracted from the media content. At least one event may be determined based at least partially on the keyword data. A token may be generated based at least partially on the at least one event and the account identifier data. The token may be communicated to the first user device based at least partially on the first user device identification data. A system and computer program product are also disclosed.

16 Claims, 5 Drawing Sheets

(56) References Cited

U.S. PATENT DOCUMENTS

2015/0127547 A1* 5/2015 Powell ................ G06Q 20/385
                                                    705/67
2017/0046635 A1* 2/2017 Thomas ................ G06Q 10/02

* cited by examiner

METHOD, SYSTEM, AND COMPUTER PROGRAM PRODUCT FOR PROVISIONING A TOKEN BASED ON MEDIA CONTENT

BACKGROUND

1. Field

This disclosed subject matter relates generally to methods, systems, and products for provisioning a token and, in some particular embodiments, to a method, system, and computer program product for provisioning a token based on media content.

2. Technical Considerations

Certain media content may include information about events. For example, streamed and/or broadcasted media content (e.g., audio content such as podcasts, and/or radio shows; visual content such as web pages, printed publications, periodicals, magazines, and/or newspapers; audiovisual content such as videos, televisions shows, and/or movies; and/or the like) may include information about events (e.g., sales, offers, discounts, rewards, advertisement campaigns, and/or the like).

However, it may be difficult for users to take advantage of (e.g., redeem, benefit from, and/or the like) such events. For example, it may be burdensome for users to collect, organize, carry, and/or use physical copies of the event data associated with the events (e.g., coupons, copies of printed advertisements, and/or the like). Additionally, it may be burdensome for users to remember and/or use a promotional code associated with the event (e.g., typing in the promotional code associated with the event and/or the like). Moreover, it may be difficult for event organizers to accurately track how many users are presented with the information about events in the media content and/or determine how many users take advantage of (e.g., redeem, benefit from, and/or the like) such events based on the media content.

SUMMARY

Accordingly, it is an object of the presently disclosed subject matter to provide methods, systems, and computer program products for provisioning a token based on media content.

According to non-limiting embodiments, provided is a computer-implemented method for provisioning a token based on media content. In some non-limiting embodiments, a computer-implemented method for provisioning a token based on media content may include receiving media content data associated with media content. Account identifier data associated with an account identifier of a first user may be received. First user device identification data associated with a first user device of the first user may be received. Keyword data associated with at least one keyword may be extracted from the media content. At least one event may be determined based at least partially on the keyword data. A token may be generated based at least partially on the at least one event and the account identifier data. The token may be communicated to the first user device based at least partially on the first user device identification data.

In some non-limiting embodiments, the media content data may include at least one of the following: audio data, visual data, any combination thereof, and/or the like.

In some non-limiting embodiments, the media content data may include metadata associated with at least one of a time or a location of the media content. Additionally or alternatively, determining the event(s) may include determining the event(s) based at least partially on the keyword data and the metadata.

In some non-limiting embodiments, the keyword(s) may include at least one of the following: an offer term, a participating merchant, a participating issuer, an eligible account type, any combination thereof, and/or the like.

In some non-limiting embodiments, the media content data may include audio data. Additionally or alternatively, extracting the keyword data may include extracting word data associated with at least one word from the media content using at least one of speech recognition, natural language processing, any combination thereof, and/or the like. Additionally or alternatively, extracting the keyword data may include determining the keyword(s) based at least partially on the word(s) extracted from the media content.

In some non-limiting embodiments, the media content may include at least one command. Additionally or alternatively, the command(s) may be detected based on the media content. Additionally or alternatively, media content data associated with the media content for a first time period (e.g., before detecting the command, after detecting the command, and/or the like) may be captured. Additionally or alternatively, the media content data (e.g., as captured during the first time period) may be communicated (e.g., transmitted and/or the like).

In some non-limiting embodiments, the account identifier data may include a general-purpose payment token. Additionally or alternatively, the token may include a special-purpose payment token associated with the at least one event.

In some non-limiting embodiments, the account identifier data may include second user device identification data associated with a second user device of the first user. Additionally or alternatively, the token may include a payment token.

In some non-limiting embodiments, a primary account number (PAN) of the first user may be determined based on the account identifier data. Additionally or alternatively, generating the token may include generating the token based at least partially on the at least one event and the PAN.

In some non-limiting embodiments, the first user device may include at least one of the following: a mobile device, a vehicle on-board system, a networked device, or any combination thereof.

In some non-limiting embodiments, first user device location data associated with a current location of the first user device may be received. Additionally or alternatively, a nearest location associated with the event(s) may be determined based at least partially on the first user device location. Additionally or alternatively, nearest location data associated with the nearest location associated with the event(s) may be communicated to the first user device.

In some non-limiting embodiments, the first user device may be detected at a location associated with event(s). Additionally or alternatively, the token may be received from the first user device. Additionally or alternatively, an authorization request including the token may be generated for a first transaction.

In some non-limiting embodiments, a request to share event data associated with the event(s) with a second user may be received. Additionally or alternatively, second account identifier data associated with a second account identifier of the second user may be received. Additionally or alternatively, second user device identification data associated with a second user device of the second user may be received. Additionally or alternatively, a second token may be generated based on the event data and the second account identifier data. Additionally or alternatively, the second token may be communicated to the second user device based at least partially on the second user device identification data.

In some non-limiting embodiments, a plurality of primary account numbers (PANs) associated with the account identifier may be determined. Additionally or alternatively, a potential reward associated with each PAN of the plurality of PANs may be determined. Additionally or alternatively, a PAN of the plurality of PANs corresponding to a greatest potential reward may be selected. Additionally or alternatively, generating the token may include generating the token based on the event(s) and the PAN of the plurality of PANs corresponding to the greatest potential reward.

In some non-limiting embodiments, the general-purpose payment token may include a first set of digits having a predetermined number of digits. Additionally or alternatively, the first set of digits may include a first bank identification number (BIN) comprising a subset of the first set of digits. Additionally or alternatively, the special-purpose payment token may include a second set of digits having the predetermined number of digits. Additionally or alternatively, the second set of digits may include a second BIN comprising a subset of the second set of digits. Additionally or alternatively, the second BIN may be different than the first BIN.

In some non-limiting embodiments, the first set of digits may include a first set of remaining digits other than the first BIN. Additionally or alternatively, the second set of digits may include a second set of remaining digits other than the second BIN. In some non-limiting embodiments, the second set of remaining digits may be determined by masking the first set of remaining digits.

In some non-limiting embodiments, masking the first set of remaining digits may include determining a four-bit representation for each digit of the first set of remaining digits. Additionally or alternatively, a four-bit masked representation for each digit of the first set of remaining digits may be determined by combining the four-bit representation with a code using at least one logic gate. Additionally or alternatively, the second set of remaining digits may be determined based on the four-bit masked representation for each digit of the first set of remaining digits.

In some non-limiting embodiments, an authorization request comprising the special-purpose token may be received. Additionally or alternatively, the general-purpose payment token may be determined based on the special-purpose payment token. In some non-limiting embodiments, a PAN may be determined based on the general-purpose token. Additionally or alternatively, a second authorization request comprising the PAN may be communicated to an issuer.

According to non-limiting embodiments, provided is a system for provisioning a token based on media content. In some non-limiting embodiments, the system for provisioning a token based on media content may include at least one user device, which may be configured to communicate media content data associated with media content, account identifier data associated with an account identifier of a first user, first user device identification data associated with a first user device of the at least one user device, any combination thereof, and/or the like. A comprehension system may be configured to receive the media content data, the account identifier data, the first user device identification data, any combination thereof, and/or the like. The comprehension system may extract keyword data associated with at least one keyword from the media content. The comprehension system may determine at least one event based at least partially on the keyword data. The comprehension system may generate a token based at least partially on the at least one event and the account identifier data. The comprehension system may communicate the token to the first user device based at least partially on the first user device identification data.

In some non-limiting embodiments, the media content data may include at least one of the following: audio data, visual data, any combination thereof, and/or the like.

In some non-limiting embodiments, the media content data may include metadata associated with at least one of a time or a location of the media content. Additionally or alternatively, determining the event(s) may include determining the event(s) based at least partially on the keyword data and the metadata.

In some non-limiting embodiments, the keyword(s) may include at least one of the following: an offer term, a participating merchant, a participating issuer, an eligible account type, any combination thereof, and/or the like.

In some non-limiting embodiments, the media content data may include audio data. Additionally or alternatively, extracting the keyword data may include extracting word data associated with at least one word from the media content using at least one of speech recognition, natural language processing, any combination thereof, and/or the like. Additionally or alternatively, extracting the keyword data may include determining the keyword(s) based at least partially on the word(s) extracted from the media content.

In some non-limiting embodiments, the media content may include at least one command. Additionally or alternatively, the command(s) may be detected based on the media content. Additionally or alternatively, media content data associated with the media content for a first time period (e.g., before detecting the command, after detecting the command, and/or the like) may be captured. Additionally or alternatively, the media content data (e.g., as captured during the first time period) may be communicated (e.g., transmitted and/or the like).

In some non-limiting embodiments, the account identifier data may include a general-purpose payment token. Additionally or alternatively, the token may include a special-purpose payment token associated with the at least one event.

In some non-limiting embodiments, the account identifier data may include second user device identification data associated with a second user device of the first user. Additionally or alternatively, the token may include a payment token.

In some non-limiting embodiments, a primary account number (PAN) of the first user may be determined based on the account identifier data. Additionally or alternatively, generating the token may include generating the token based at least partially on the at least one event and the PAN.

In some non-limiting embodiments, the first user device may include at least one of the following: a mobile device, a vehicle on-board system, a networked device, or any combination thereof.

In some non-limiting embodiments, first user device location data associated with a current location of the first user device may be received. Additionally or alternatively, a nearest location associated with the event(s) may be determined based at least partially on the first user device location. Additionally or alternatively, nearest location data associated with the nearest location associated with the event(s) may be communicated to the first user device.

In some non-limiting embodiments, the first user device may be detected at a location associated with event(s). Additionally or alternatively, the token may be received from the first user device. Additionally or alternatively, an authorization request including the token may be generated for a first transaction.

In some non-limiting embodiments, a request to share event data associated with the event(s) with a second user may be received. Additionally or alternatively, second account identifier data associated with a second account identifier of the second user may be received. Additionally or alternatively, second user device identification data associated with a second user device of the second user may be received. Additionally or alternatively, a second token may be generated based on the event data and the second account identifier data. Additionally or alternatively, the second token may be communicated to the second user device based at least partially on the second user device identification data.

In some non-limiting embodiments, a plurality of primary account numbers (PANs) associated with the account identifier may be determined. Additionally or alternatively, a potential reward associated with each PAN of the plurality of PANs may be determined. Additionally or alternatively, a PAN of the plurality of PANs corresponding to a greatest potential reward may be selected. Additionally or alternatively, generating the token may include generating the token based on the event(s) and the PAN of the plurality of PANs corresponding to the greatest potential reward.

In some non-limiting embodiments, the general-purpose payment token may include a first set of digits having a predetermined number of digits. Additionally or alternatively, the first set of digits may include a first bank identification number (BIN) comprising a subset of the first set of digits. Additionally or alternatively, the special-purpose payment token may include a second set of digits having the predetermined number of digits. Additionally or alternatively, the second set of digits may include a second BIN comprising a subset of the second set of digits. Additionally or alternatively, the second BIN may be different than the first BIN.

In some non-limiting embodiments, the first set of digits may include a first set of remaining digits other than the first BIN. Additionally or alternatively, the second set of digits may include a second set of remaining digits other than the second BIN. In some non-limiting embodiments, the second set of remaining digits may be determined by masking the first set of remaining digits.

In some non-limiting embodiments, masking the first set of remaining digits may include determining a four-bit representation for each digit of the first set of remaining digits. Additionally or alternatively, a four-bit masked representation for each digit of the first set of remaining digits may be determined by combining the four-bit representation with a code using at least one logic gate. Additionally or alternatively, the second set of remaining digits may be determined based on the four-bit masked representation for each digit of the first set of remaining digits.

In some non-limiting embodiments, an authorization request comprising the special-purpose token may be received. Additionally or alternatively, the general-purpose payment token may be determined based on the special-purpose payment token. In some non-limiting embodiments, a PAN may be determined based on the general-purpose token. Additionally or alternatively, a second authorization request comprising the PAN may be communicated to an issuer.

According to non-limiting embodiments, provided is a computer program product for provisioning a token based on media content. The computer program product may include at least one non-transitory computer-readable medium including one or more instructions that, when executed by at least one processor, cause the at least one processor to receive media content data associated with media content. Account identifier data associated with an account identifier of a first user may be received. First user device identification data associated with a first user device of the first user may be received. Keyword data associated with at least one keyword may be extracted from the media content. At least one event may be determined based at least partially on the keyword data. A token may be generated based at least partially on the at least one event and the account identifier data. The token to the first user device may be communicated based at least partially on the first user device identification data.

In some non-limiting embodiments, the media content data may include at least one of the following: audio data, visual data, any combination thereof, and/or the like.

In some non-limiting embodiments, the media content data may include metadata associated with at least one of a time or a location of the media content. Additionally or alternatively, determining the event(s) may include determining the event(s) based at least partially on the keyword data and the metadata.

In some non-limiting embodiments, the keyword(s) may include at least one of the following: an offer term, a participating merchant, a participating issuer, an eligible account type, any combination thereof, and/or the like.

In some non-limiting embodiments, the media content data may include audio data. Additionally or alternatively, extracting the keyword data may include extracting word data associated with at least one word from the media content using at least one of speech recognition, natural language processing, any combination thereof, and/or the like. Additionally or alternatively, extracting the keyword data may include determining the keyword(s) based at least partially on the word(s) extracted from the media content.

In some non-limiting embodiments, the media content may include at least one command. Additionally or alternatively, the command(s) may be detected based on the media content. Additionally or alternatively, media content data associated with the media content for a first time period (e.g., before detecting the command, after detecting the command, and/or the like) may be captured. Additionally or alternatively, the media content data (e.g., as captured during the first time period) may be communicated (e.g., transmitted and/or the like).

In some non-limiting embodiments, the account identifier data may include a general-purpose payment token. Additionally or alternatively, the token may include a special-purpose payment token associated with the at least one event.

In some non-limiting embodiments, the account identifier data may include second user device identification data associated with a second user device of the first user. Additionally or alternatively, the token may include a payment token.

In some non-limiting embodiments, a primary account number (PAN) of the first user may be determined based on the account identifier data. Additionally or alternatively, generating the token may include generating the token based at least partially on the at least one event and the PAN.

In some non-limiting embodiments, the first user device may include at least one of the following: a mobile device, a vehicle on-board system, a networked device, or any combination thereof.

In some non-limiting embodiments, first user device location data associated with a current location of the first user device may be received. Additionally or alternatively, a nearest location associated with the event(s) may be determined based at least partially on the first user device location. Additionally or alternatively, nearest location data associated with the nearest location associated with the event(s) may be communicated to the first user device.

In some non-limiting embodiments, the first user device may be detected at a location associated with event(s). Additionally or alternatively, the token may be received from the first user device. Additionally or alternatively, an authorization request including the token may be generated for a first transaction.

In some non-limiting embodiments, a request to share event data associated with the event(s) with a second user may be received. Additionally or alternatively, second account identifier data associated with a second account identifier of the second user may be received. Additionally or alternatively, second user device identification data associated with a second user device of the second user may be received. Additionally or alternatively, a second token may be generated based on the event data and the second account identifier data. Additionally or alternatively, the second token may be communicated to the second user device based at least partially on the second user device identification data.

In some non-limiting embodiments, a plurality of primary account numbers (PANs) associated with the account identifier may be determined. Additionally or alternatively, a potential reward associated with each PAN of the plurality of PANs may be determined. Additionally or alternatively, a PAN of the plurality of PANs corresponding to a greatest potential reward may be selected. Additionally or alternatively, generating the token may include generating the token based on the event(s) and the PAN of the plurality of PANs corresponding to the greatest potential reward.

In some non-limiting embodiments, the general-purpose payment token may include a first set of digits having a predetermined number of digits. Additionally or alternatively, the first set of digits may include a first bank identification number (BIN) comprising a subset of the first set of digits. Additionally or alternatively, the special-purpose payment token may include a second set of digits having the predetermined number of digits. Additionally or alternatively, the second set of digits may include a second BIN comprising a subset of the second set of digits. Additionally or alternatively, the second BIN may be different than the first BIN.

In some non-limiting embodiments, the first set of digits may include a first set of remaining digits other than the first BIN. Additionally or alternatively, the second set of digits may include a second set of remaining digits other than the second BIN. In some non-limiting embodiments, the second set of remaining digits may be determined by masking the first set of remaining digits.

In some non-limiting embodiments, masking the first set of remaining digits may include determining a four-bit representation for each digit of the first set of remaining digits. Additionally or alternatively, a four-bit masked representation for each digit of the first set of remaining digits may be determined by combining the four-bit representation with a code using at least one logic gate. Additionally or alternatively, the second set of remaining digits may be determined based on the four-bit masked representation for each digit of the first set of remaining digits.

In some non-limiting embodiments, an authorization request comprising the special-purpose token may be received. Additionally or alternatively, the general-purpose payment token may be determined based on the special-purpose payment token. In some non-limiting embodiments, a PAN may be determined based on the general-purpose token. Additionally or alternatively, a second authorization request comprising the PAN may be communicated to an issuer.

Further embodiments are set forth in the following numbered clauses:

Clause 1: A computer-implemented method, comprising: receiving, with at least one processor, media content data associated with media content; receiving, with at least one processor, account identifier data associated with an account identifier of a first user; receiving, with at least one processor, first user device identification data associated with a first user device of the first user; extracting, with at least one processor, keyword data associated with at least one keyword from the media content; determining, with at least one processor, at least one event based at least partially on the keyword data; generating, with at least one processor, a token based at least partially on the at least one event and the account identifier data; and communicating, with at least one processor, the token to the first user device based at least partially on the first user device identification data.

Clause 2: The method of clause 1, wherein the media content data comprises at least one of the following: audio data, visual data, or any combination thereof.

Clause 3: The method of clauses 1 or 2, wherein the media content data further comprises metadata associated with at least one of a time or a location of the media content, and wherein determining the at least one event comprises determining, with at least one processor, the at least one event based at least partially on the keyword data and the metadata.

Clause 4: The method of any preceding clause, wherein the at least one keyword comprises at least one of the following: an offer term, a participating merchant, a participating issuer, an eligible account type, or any combination thereof.

Clause 5: The method of any preceding clause, wherein the media content data comprises audio data, and wherein extracting the keyword data comprises: extracting, with at least one processor, word data associated with at least one word from the media content using at least one of speech recognition or natural language processing; and determining, with at least one processor, the at least one keyword based at least partially on the at least one word extracted from the media content.

Clause 6: The method of any preceding clause, wherein the media content comprises at least one command, the method further comprising: detecting, with at least one processor, the at least one command based on the media content; capturing, with at least one processor, media content data associated with the media content for a first time period after detecting the command; and transmitting, with at least one processor, the media content data.

Clause 7: The method of any preceding clause, wherein the account identifier data comprises a general-purpose payment token, and wherein the token comprises a special-purpose payment token associated with the at least one event.

Clause 8: The method of any preceding clause, wherein the account identifier data comprises second user device identification data associated with a second user device of the first user, and wherein the token comprises a payment token.

Clause 9: The method of any preceding clause, further comprising: determining, with at least one processor, a primary account number (PAN) of the first user based on the account identifier data, wherein generating the token comprises generating, with at least one processor, the token based at least partially on the at least one event and the PAN.

Clause 10: The method of any preceding clause, wherein the first user device comprises at least one of the following: a mobile device, a vehicle on-board system, a networked device, or any combination thereof.

Clause 11: The method of any preceding clause, further comprising: receiving, with at least one processor, first user device location data associated with a current location of the first user device; determining, with at least one processor, a nearest location associated with the at least one event based at least partially on the first user device location; and communicating, with at least one processor, nearest location data associated with the nearest location associated with the at least one event to the first user device.

Clause 12: The method of any preceding clause, further comprising: detecting, with at least one processor, the first user device at a location associated with the at least one event; receiving, with at least one processor, the token from the first user device; and generating, with at least one processor, an authorization request comprising the token for a first transaction.

Clause 13: The method of any preceding clause, further comprising: receiving, with at least one processor, a request to share event data associated with the at least one event with a second user; receiving, with at least one processor, second account identifier data associated with a second account identifier of the second user; receiving, with at least one processor, second user device identification data associated with a second user device of the second user; generating, with at least one processor, a second token based on the event data and the second account identifier data; and communicating, with at least one processor, the second token to the second user device based at least partially on the second user device identification data.

Clause 14: The method of any preceding clause, further comprising: determining, with at least one processor, a plurality of primary account numbers (PANs) associated with the account identifier; determining, with at least one processor, a potential reward associated with each PAN of the plurality of PANs; and selecting, with at least one processor, a PAN of the plurality of PANs corresponding to a greatest potential reward, wherein generating the token comprises generating, with at least one processor, the token based on the at least one event and the PAN of the plurality of PANs corresponding to the greatest potential reward.

Clause 15: The method of any preceding clause, wherein the general-purpose payment token comprises a first set of digits having a predetermined number of digits, the first set of digits comprising a first bank identification number (BIN) comprising a subset of the first set of digits, and wherein the special-purpose payment token comprises a second set of digits having the predetermined number of digits, the second set of digits comprising a second BIN comprising a subset of the second set of digits, the second BIN being different than the first BIN.

Clause 16: The method of any preceding clause, wherein the first set of digits comprises a first set of remaining digits other than the first BIN and the second set of digits comprises a second set of remaining digits other than the second BIN, the method further comprising: determining, with at least one processor, the second set of remaining digits by masking the first set of remaining digits.

Clause 17: The method of any preceding clause, wherein masking the first set of remaining digits comprises: determining, with at least one processor, a four-bit representation for each digit of the first set of remaining digits; determining, with at least one processor, a four-bit masked representation for each digit of the first set of remaining digits by combining the four-bit representation with a code using at least one logic gate; and determining, with at least one processor, the second set of remaining digits based on the four-bit masked representation for each digit of the first set of remaining digits.

Clause 18: The method of any preceding clause, further comprising: receiving, with at least one processor, an authorization request comprising the special-purpose token; and determining, with at least one processor, the general-purpose payment token based on the special-purpose payment token.

Clause 19: The method of any preceding clause, further comprising: determining, with at least one processor, a PAN based on the general-purpose token; and communicating, with at least one processor, a second authorization request comprising the PAN to an issuer.

Clause 20: A system, comprising: at least one user device configured to communicate media content data associated with media content, account identifier data associated with an account identifier of a first user, and first user device identification data associated with a first user device of the at least one user device; a comprehension system configured to: receive the media content data, the account identifier data, and the first user device identification data; extract keyword data associated with at least one keyword from the media content; determine at least one event based at least partially on the keyword data; generate a token based at least partially on the at least one event and the account identifier data; and communicate the token to the first user device based at least partially on the first user device identification data.

Clause 21: The system of clause 20, wherein the media content data comprises at least one of the following: audio data, visual data, or any combination thereof.

Clause 22: The system of clauses 20 or 21, wherein the media content data further comprises metadata associated with at least one of a time or a location of the media content, and wherein determining the at least one event comprises determining the at least one event based at least partially on the keyword data and the metadata.

Clause 23: The system of any one of clauses 20-22, wherein the at least one keyword comprises at least one of the following: an offer term, a participating merchant, a participating issuer, an eligible account type, or any combination thereof.

Clause 24: The system of any one of clauses 20-23, wherein the media content data comprises audio data, and wherein extracting the keyword data comprises: extracting word data associated with at least one word from the media content using at least one of speech recognition or natural language processing; and determining the at least one keyword based at least partially on the at least one word extracted from the media content.

Clause 25: The system of any one of clauses 20-24, wherein the media content comprises at least one command, wherein the comprehension system is further configured to: detect the at least one command based on the media content; capture media content data associated with the media content for a first time period after detecting the command; and transmit the media content data.

Clause 26: The system of any one of clauses 20-25, wherein the account identifier data comprises a general-purpose payment token, and wherein the token comprises a special-purpose payment token associated with the at least one event.

Clause 27: The system of any one of clauses 20-26, wherein the account identifier data comprises second user device identification data associated with a second user device of the first user, and wherein the token comprises a payment token.

Clause 28: The system of any one of clauses 20-27, wherein the comprehension system is further configured to: determine a primary account number (PAN) of the first user based on the account identifier data, wherein generating the token comprises generating the token based at least partially on the at least one event and the PAN.

Clause 29: The system of any one of clauses 20-28, wherein the first user device comprises at least one of the following: a mobile device, a vehicle on-board system, a networked device, or any combination thereof.

Clause 30: The system of any one of clauses 20-29, wherein the comprehension system is further configured to: receive first user device location data associated with a current location of the first user device; determine a nearest location associated with the at least one event based at least partially on the first user device location; and communicate nearest location data associated with the nearest location associated with the at least one event to the first user device.

Clause 31: The system of any one of clauses 20-30, wherein the comprehension system is further configured to: detect the first user device at a location associated with the at least one event; receive the token from the first user device; and generate an authorization request comprising the token for a first transaction.

Clause 32: The system of any one of clauses 20-31, wherein the comprehension system is further configured to: receive a request to share event data associated with the at least one event with a second user; receive second account identifier data associated with a second account identifier of the second user; receive second user device identification data associated with a second user device of the second user; generate a second token based on the event data and the second account identifier data; and communicate the second token to the second user device based at least partially on the second user device identification data.

Clause 33: The system of any one of clauses 20-32, wherein the comprehension system is further configured to: determine a plurality of primary account numbers (PANs) associated with the account identifier; determine a potential reward associated with each PAN of the plurality of PANs; and select a PAN of the plurality of PANs corresponding to a greatest potential reward, wherein generating the token comprises generating, with at least one processor, the token based on the at least one event and the PAN of the plurality of PANs corresponding to the greatest potential reward.

Clause 34: The system of any one of clauses 20-33, wherein the general-purpose payment token comprises a first set of digits having a predetermined number of digits, the first set of digits comprising a first bank identification number (BIN) comprising a subset of the first set of digits, and wherein the special-purpose payment token comprises a second set of digits having the predetermined number of digits, the second set of digits comprising a second BIN comprising a subset of the second set of digits, the second BIN being different than the first BIN.

Clause 35: The system of any one of clauses 20-34, wherein the first set of digits comprises a first set of remaining digits other than the first BIN and the second set of digits comprises a second set of remaining digits other than the second BIN, wherein the comprehension system is further configured to: determine the second set of remaining digits by masking the first set of remaining digits.

Clause 36: The system of any one of clauses 20-35, wherein masking the first set of remaining digits comprises: determining a four-bit representation for each digit of the first set of remaining digits; determining a four-bit masked representation for each digit of the first set of remaining digits by combining the four-bit representation with a code using at least one logic gate; and determining the second set of remaining digits based on the four-bit masked representation for each digit of the first set of remaining digits.

Clause 37: The system of any one of clauses 20-36, wherein the comprehension system is further configured to: receive an authorization request comprising the special-purpose token; and determine the general-purpose payment token based on the special-purpose payment token.

Clause 28: The system of any one of clauses 20-37, wherein the comprehension system is further configured to: determine a PAN based on the general-purpose token; and communicate a second authorization request comprising the PAN to an issuer.

Clause 39: A computer program product comprising at least one non-transitory computer-readable medium including one or more instructions that, when executed by at least one processor, cause the at least one processor to: receive media content data associated with media content; receive account identifier data associated with an account identifier of a first user; receive first user device identification data associated with a first user device of the first user; extract keyword data associated with at least one keyword from the media content; determine at least one event based at least partially on the keyword data; generate a token based at least partially on the at least one event and the account identifier data; and communicate the token to the first user device based at least partially on the first user device identification data.

Clause 40: The computer program product of clause 39, wherein the media content data comprises at least one of the following: audio data, visual data, or any combination thereof.

Clause 41: The computer program product of clauses 39 or 40, wherein the media content data further comprises metadata associated with at least one of a time or a location of the media content, and wherein determining the at least one event comprises determining the at least one event based at least partially on the keyword data and the metadata.

Clause 42: The computer program product of any one of clauses 39-41, wherein the at least one keyword comprises at least one of the following: an offer term, a participating merchant, a participating issuer, an eligible account type, or any combination thereof.

Clause 43: The computer program product of any one of clauses 39-42, wherein the media content data comprises audio data, and wherein extracting the keyword data comprises: extracting word data associated with at least one word from the media content using at least one of speech recognition or natural language processing; and determining the at least one keyword based at least partially on the at least one word extracted from the media content.

Clause 44: The computer program product of any one of clauses 39-43, wherein the media content comprises at least one command, wherein the instructions further cause the at least one processor to: detect the at least one command based on the media content; capture media content data associated with the media content for a first time period after detecting the command; and transmit the media content data.

Clause 45: The computer program product of any one of clauses 39-44, wherein the account identifier data comprises a general-purpose payment token, and wherein the token comprises a special-purpose payment token associated with the at least one event.

Clause 46: The computer program product of any one of clauses 39-45, wherein the account identifier data comprises second user device identification data associated with a second user device of the first user, and wherein the token comprises a payment token.

Clause 47: The computer program product of any one of clauses 39-46, wherein the instructions further cause the at least one processor to: determine a primary account number (PAN) of the first user based on the account identifier data, wherein generating the token comprises generating the token based at least partially on the at least one event and the PAN.

Clause 48: The computer program product of any one of clauses 39-47, wherein the first user device comprises at least one of the following: a mobile device, a vehicle on-board system, a networked device, or any combination thereof.

Clause 49: The computer program product of any one of clauses 39-48, wherein the instructions further cause the at least one processor to: receive first user device location data associated with a current location of the first user device; determine a nearest location associated with the at least one event based at least partially on the first user device location; and communicate nearest location data associated with the nearest location associated with the at least one event to the first user device.

Clause 50: The computer program product of any one of clauses 39-49, wherein the instructions further cause the at least one processor to: detect the first user device at a location associated with the at least one event; receive the token from the first user device; and generate an authorization request comprising the token for a first transaction.

Clause 51: The computer program product of any one of clauses 39-50, wherein the instructions further direct the at least one processor to: receive a request to share event data associated with the at least one event with a second user; receive second account identifier data associated with a second account identifier of the second user; receive second user device identification data associated with a second user device of the second user; generate a second token based on the event data and the second account identifier data; and communicate the second token to the second user device based at least partially on the second user device identification data.

Clause 52: The computer program product of any one of clauses 39-51, wherein the instructions further cause the at least one processor to: determine a plurality of primary account numbers (PANs) associated with the account identifier; determine a potential reward associated with each PAN of the plurality of PANs; and select a PAN of the plurality of PANs corresponding to a greatest potential reward, wherein generating the token comprises generating, with at least one processor, the token based on the at least one event and the PAN of the plurality of PANs corresponding to the greatest potential reward.

Clause 53: The computer program product of any one of clauses 39-52, wherein the general-purpose payment token comprises a first set of digits having a predetermined number of digits, the first set of digits comprising a first bank identification number (BIN) comprising a subset of the first set of digits, and wherein the special-purpose payment token comprises a second set of digits having the predetermined number of digits, the second set of digits comprising a second BIN comprising a subset of the second set of digits, the second BIN being different than the first BIN.

Clause 54: The computer program product of any one of clauses 39-53, wherein the first set of digits comprises a first set of remaining digits other than the first BIN and the second set of digits comprises a second set of remaining digits other than the second BIN, wherein the instructions further cause the at least one processor to: determine the second set of remaining digits by masking the first set of remaining digits.

Clause 55: The computer program product of any one of clauses 39-54, wherein masking the first set of remaining digits comprises: determining a four-bit representation for each digit of the first set of remaining digits; determining a four-bit masked representation for each digit of the first set of remaining digits by combining the four-bit representation with a code using at least one logic gate; and determining the second set of remaining digits based on the four-bit masked representation for each digit of the first set of remaining digits.

Clause 56: The computer program product of any one of clauses 39-55, wherein the instructions further cause the at least one processor to: receive an authorization request comprising the special-purpose token; and determine the general-purpose payment token based on the special-purpose payment token.

Clause 57: The computer program product of any one of clauses 39-56, wherein the instructions further cause the at least one processor to: determine a PAN based on the general-purpose token; and communicate a second authorization request comprising the PAN to an issuer.

These and other features and characteristics of the presently disclosed subject matter, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed subject matter. As used in the specification and the claims, the singular form of "a," "an," and "the" include plural referents unless the context clearly dictates otherwise.

BRIEF DESCRIPTION OF THE DRAWINGS

Additional advantages and details of the disclosed subject matter are explained in greater detail below with reference to the exemplary embodiments that are illustrated in the accompanying figures, in which.

DESCRIPTION

Figure 1:
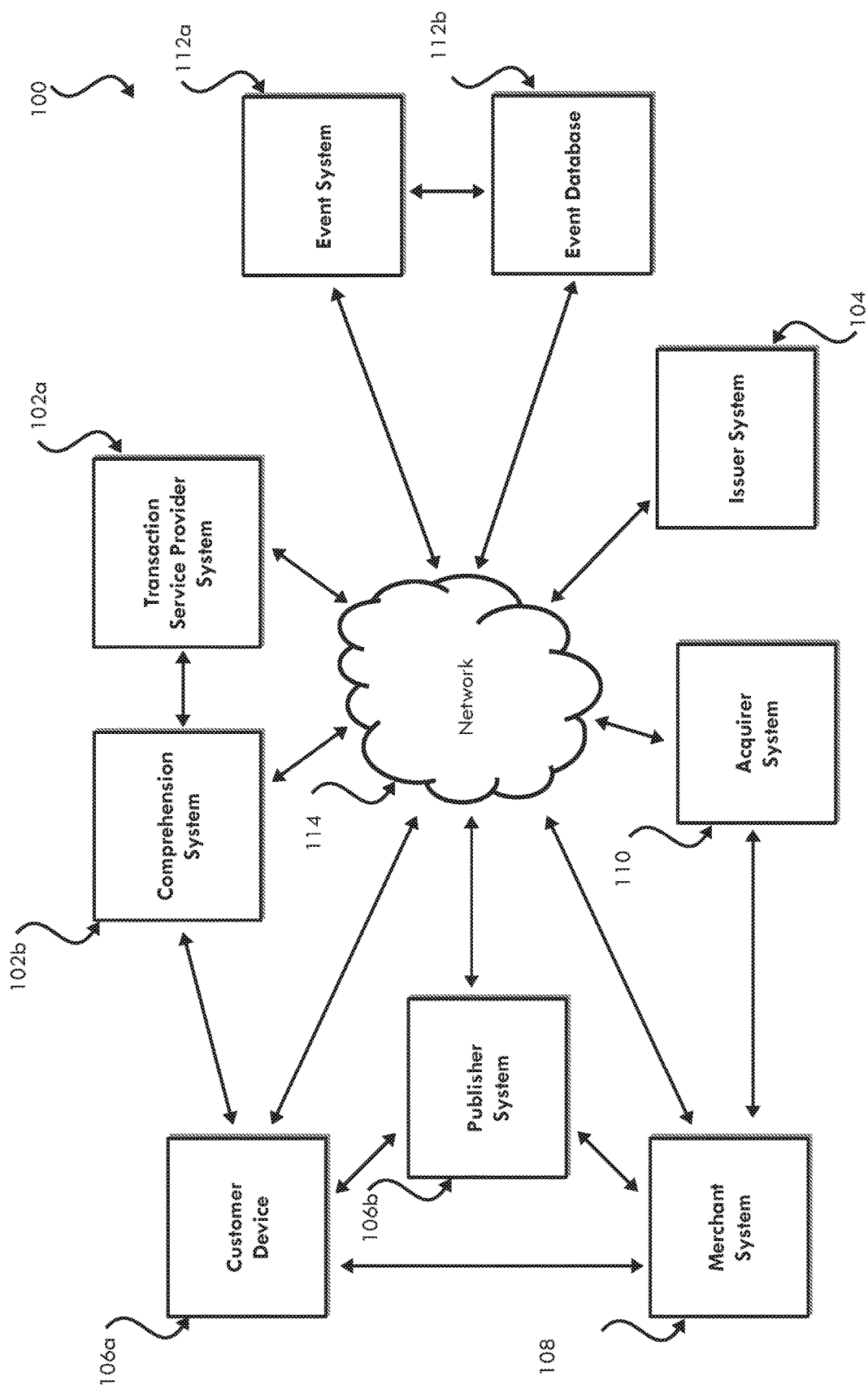
FIG. 1 is a diagram of a non-limiting embodiment of an environment in which systems, methods, and/or computer program products, described herein, may be implemented according to the principles of the presently disclosed subject matter.

For purposes of the description hereinafter, the terms "end," "upper," "lower," "right," "left," "vertical," "horizontal," "top," "bottom," "lateral," "longitudinal," and derivatives thereof shall relate to the disclosed subject matter as it is oriented in the drawing figures. However, it is to be understood that the disclosed subject matter may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet and/or the like) that includes data. It will be appreciated that numerous other arrangements are possible.

As used herein, the terms "issuer institution," "portable financial device issuer," "issuer," or "issuer bank" may refer to one or more entities that provide accounts to customers for conducting transactions (e.g., payment transactions), such as initiating credit and/or debit payments. For example, an issuer institution may provide an account identifier, such as a primary account number (PAN), to a customer that uniquely identifies one or more accounts associated with that customer. The account identifier may be embodied on a portable financial device, such as a physical financial instrument, e.g., a payment card, and/or may be electronic and used for electronic payments. The terms "issuer institution" and "issuer institution system" may also refer to one or more computer systems operated by or on behalf of an issuer institution, such as a server computer executing one or more software applications. For example, an issuer institution system may include one or more authorization servers for authorizing a transaction.

As used herein, the term "account identifier" may include one or more types of identifiers associated with a user account (e.g., a PAN, a card number, a payment card number, a payment token, and/or the like). In some non-limiting embodiments, an issuer institution may provide an account identifier (e.g., a PAN, a payment token, and/or the like) to a user that uniquely identifies one or more accounts associated with that user. The account identifier may be embodied on a physical financial instrument (e.g., a portable financial instrument, a payment card, a credit card, a debit card, and/or the like) and/or may be electronic information communicated to the user that the user may use for electronic payments. In some non-limiting embodiments, the account identifier may be an original account identifier, where the original account identifier was provided to a user at the creation of the account associated with the account identifier. In some non-limiting embodiments, the account identifier may be an account identifier (e.g., a supplemental account identifier) that is provided to a user after the original account identifier was provided to the user. For example, if the original account identifier is forgotten, stolen, and/or the like, a supplemental account identifier may be provided to the user. In some non-limiting embodiments, an account identifier may be directly or indirectly associated with an issuer institution such that an account identifier may be a payment token that maps to a PAN or other type of identifier. Account identifiers may be alphanumeric, any combination of characters and/or symbols, and/or the like. An issuer institution may be associated with a bank identification number (BIN) that uniquely identifies the issuer institution.

As used herein, the terms "payment token" or "token" may refer to an identifier that is used as a substitute or replacement identifier for an account identifier, such as a PAN. Tokens may be associated with a PAN or other account identifiers in one or more data structures (e.g., one or more databases and/or the like) such that they can be used to conduct a transaction (e.g., a payment transaction) without directly using the account identifier, such as a PAN. In some examples, an account identifier, such as a PAN, may be associated with a plurality of tokens for different individuals, different uses, and/or different purposes. For example, a payment token may include a series of numeric and/or alphanumeric characters that may be used as a substitute for an original account identifier. For example, a payment token "4900 0000 0000 0001" may be used in place of a PAN "4147 0900 0000 1234." In some non-limiting embodiments, a payment token may be "format preserving" and may have a numeric format that conforms to the account identifiers used in existing payment processing networks (e.g., ISO 8583 financial transaction message format). In some non-limiting embodiments, a payment token may be used in place of a PAN to initiate, authorize, settle, or resolve a payment transaction or represent the original credential in other systems where the original credential would typically be provided. In some non-limiting embodiments, a token value may be generated such that the recovery of the original PAN or other account identifier from the token value may not be computationally derived (e.g., with a one-way hash or other cryptographic function). Further, in some non-limiting embodiments, the token format may be configured to allow the entity receiving the payment token to identify it as a payment token and recognize the entity that issued the token.

As used herein, the term "provisioning" may refer to a process of enabling a device to use a resource or service. For example, provisioning may involve enabling a device to perform transactions using an account. Additionally or alternatively, provisioning may include adding provisioning data associated with account data (e.g., a payment token representing an account number) to a device.

As used herein, the term "token requestor" may refer to an entity that is seeking to implement tokenization according to embodiments of the presently disclosed subject matter. For example, the token requestor may initiate a request that a PAN be tokenized by submitting a token request message to a token service provider. Additionally or alternatively, a token requestor may no longer need to store a PAN associated with a token once the requestor has received the payment token in response to a token request message. In some non-limiting embodiments, the requestor may be an application, a device, a process, or a system that is configured to perform actions associated with tokens. For example, a requestor may request registration with a network token system, request token generation, token activation, token de-activation, token exchange, other token lifecycle management related processes, and/or any other token related processes. In some non-limiting embodiments, a requestor may interface with a network token system through any suitable communication network and/or protocol (e.g., using HTTPS, SOAP and/or an XML interface among others). For example, a token requestor may include card-on-file merchants, acquirers, acquirer processors, payment gateways acting on behalf of merchants, payment enablers (e.g., original equipment manufacturers, mobile network operators, and/or the like), digital wallet providers, issuers, third-party wallet providers, payment processing networks, and/or the like. In some non-limiting embodiments, a token requestor may request tokens for multiple domains and/or channels. Additionally or alternatively, a token requestor may be registered and identified uniquely by the token service provider within the tokenization ecosystem. For example, during token requestor registration, the token service provider may formally process a token requestor's application to participate in the token service system. In some non-limiting embodiments, the token service provider may collect information pertaining to the nature of the requestor and relevant use of tokens to validate and formally approve the token requestor and establish appropriate domain restriction controls. Additionally or alternatively, successfully registered token requestors may be assigned a token requestor identifier that may also be entered and maintained within the token vault. In some non-limiting embodiments, token requestor identifiers may be revoked and/or token requestors may be assigned new token requestor identifiers. In some non-limiting embodiments, this information may be subject to reporting and audit by the token service provider.

As used herein, the term a "token service provider" may refer to an entity including one or more server computers in a token service system that generates, processes and maintains payment tokens. For example, the token service provider may include or be in communication with a token vault where the generated tokens are stored. Additionally or alternatively, the token vault may maintain one-to-one mapping between a token and a PAN represented by the token. In some non-limiting embodiments, the token service provider may have the ability to set aside licensed BINs as token BINs to issue tokens for the PANs that may be submitted to the token service provider. In some non-limiting embodiments, various entities of a tokenization ecosystem may assume the roles of the token service provider. For example, payment networks and issuers or their agents may become the token service provider by implementing the token services according to non-limiting embodiments of the presently disclosed subject matter. Additionally or alternatively, a token service provider may provide reports or data output to reporting tools regarding approved, pending, or declined token requests, including any assigned token requestor ID. The token service provider may provide data output related to token-based transactions to reporting tools and applications and present the token and/or PAN as appropriate in the reporting output. In some non-limiting embodiments, the EMVCo standards organization may publish specifications defining how tokenized systems may operate. For example, such specifications may be informative, but they are not intended to be limiting upon any of the presently disclosed subject matter.

As used herein, the term "token vault" may refer to a repository that maintains established token-to-PAN mappings. For example, the token vault may also maintain other attributes of the token requestor that may be determined at the time of registration and/or that may be used by the token service provider to apply domain restrictions or other controls during transaction processing. In some non-limiting embodiments, the token vault may be a part of a token service system. For example, the token vault may be provided as a part of the token service provider. Additionally or alternatively, the token vault may be a remote repository accessible by the token service provider. In some non-limiting embodiments, token vaults, due to the sensitive nature of the data mappings that are stored and managed therein, may be protected by strong underlying physical and logical security. Additionally or alternatively, a token vault may be operated by any suitable entity, including a payment network, an issuer, clearing houses, other financial institutions, transaction service providers, and/or the like.

As used herein, the term "merchant" may refer to one or more entities (e.g., operators of retail businesses that provide goods and/or services, and/or access to goods and/or services, to a user (e.g., a customer, a consumer, a customer of the merchant, and/or the like) based on a transaction (e.g., a payment transaction)). As used herein, the term "merchant system" may refer to one or more computer systems operated by or on behalf of a merchant, such as a server computer executing one or more software applications. As used herein, the term "product" may refer to one or more goods and/or services offered by a merchant.

As used herein, the term "point-of-sale (POS) device" may refer to one or more devices, which may be used by a merchant to initiate transactions (e.g., a payment transaction), engage in transactions, and/or process transactions. For example, a POS device may include one or more computers, peripheral devices, card readers, near-field communication (NFC) receivers, radio frequency identification (RFID) receivers, and/or other contactless transceivers or receivers, contact-based receivers, payment terminals, computers, servers, input devices, and/or the like.

As used herein, the term "point-of-sale (POS) system" may refer to one or more computers and/or peripheral devices used by a merchant to conduct a transaction. For example, a POS system may include one or more POS devices and/or other like devices that may be used to conduct a payment transaction. A POS system (e.g., a merchant POS system) may also include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and the issuer institution. In some non-limiting embodiments, a transaction service provider may include a credit card company, a debit card company, and/or the like. As used herein, the term "transaction service provider system" may also refer to one or more computer systems operated by or on behalf of a transaction service provider, such as a transaction processing server executing one or more software applications. A transaction processing server may include one or more processors and, in some non-limiting embodiments, may be operated by or on behalf of a transaction service provider.

As used herein, the term "acquirer" may refer to an entity licensed by the transaction service provider and approved by the transaction service provider to originate transactions (e.g., payment transactions) using a portable financial device associated with the transaction service provider. As used herein, the term "acquirer system" may also refer to one or more computer systems, computer devices, and/or the like operated by or on behalf of an acquirer. The transactions the acquirer may include payment transactions (e.g., purchases, original credit transactions (OCTs), account funding transactions (AFTs), and/or the like). In some non-limiting embodiments, the acquirer may be authorized by the transaction service provider to assign merchant or service providers to originate transactions using a portable financial device of the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure that proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by an acquirer's payment facilitators, and/or the like. In some non-limiting embodiments, an acquirer may be a financial institution, such as a bank.

As used herein, the terms "electronic wallet," "electronic wallet mobile application," and "digital wallet" may refer to one or more electronic devices and/or one or more software applications configured to initiate and/or conduct transactions (e.g., payment transactions, electronic payment transactions, and/or the like). For example, an electronic wallet may include a user device (e.g., a mobile device) executing an application program and server-side software and/or databases for maintaining and providing transaction data to the user device. As used herein, the term "electronic wallet provider" may include an entity that provides and/or maintains an electronic wallet and/or an electronic wallet mobile application for a user (e.g., a customer). Examples of an electronic wallet provider include, but are not limited to, Google Pay®, Android Pay®, Apple Pay®, and Samsung Pay®. In some non-limiting examples, a financial institution (e.g., an issuer institution) may be an electronic wallet provider. As used herein, the term "electronic wallet provider system" may refer to one or more computer systems, computer devices, servers, groups of servers, and/or the like operated by or on behalf of an electronic wallet provider.

As used herein, the term "portable financial device" may refer to a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet mobile application, a personal digital assistant (PDA), a pager, a security card, a computer, an access card, a wireless terminal, a transponder, and/or the like. In some non-limiting embodiments, the portable financial device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway and/or to a payment gateway itself. As used herein, the term "payment gateway mobile application" may refer to one or more electronic devices and/or one or more software applications configured to provide payment services for transactions (e.g., payment transactions, electronic payment transactions, and/or the like).

As used herein, the terms "client" and "client device" may refer to one or more client-side devices or systems (e.g., remote from a transaction service provider) used to initiate or facilitate a transaction (e.g., a payment transaction). As an example, a "client device" may refer to one or more POS devices used by a merchant, one or more acquirer host computers used by an acquirer, one or more mobile devices used by a user, and/or the like. In some non-limiting embodiments, a client device may be an electronic device configured to communicate with one or more networks and initiate or facilitate transactions. For example, a client device may include one or more computers, portable computers, laptop computers, tablet computers, mobile devices, cellular phones, wearable devices (e.g., watches, glasses, lenses, clothing, and/or the like), PDAs, and/or the like. Moreover, a "client" may also refer to an entity (e.g., a merchant, an acquirer, and/or the like) that owns, utilizes, and/or operates a client device for initiating transactions (e.g., for initiating transactions with a transaction service provider).

As used herein, the term "server" may refer to one or more computing devices (e.g., processors, storage devices, similar computer components, and/or the like) that communicate with client devices and/or other computing devices over a network (e.g., a public network, the Internet, a private network, and/or the like) and, in some examples, facilitate communication among other servers and/or client devices. It will be appreciated that various other arrangements are possible. As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different server or processor, and/or a combination of servers and/or processors. For example, as used in the specification and the claims, a first server or a first processor that is recited as performing a first step or a first function may refer to the same or different server or the same or different processor recited as performing a second step or a second function.

Non-limiting embodiments of the disclosed subject matter are directed to methods, systems, and computer program products for provisioning a token, including, but not limited to, provisioning a token based on media content. For example, non-limiting embodiments of the disclosed subject matter provide determining an event based on keyword data extracted from media content and generating a token based on the event and a received account identifier for communication to an identified user device. Such embodiments provide techniques and systems that reduce (e.g., eliminate, decrease, and/or the like) manual efforts and reduce time spent manually collecting, organizing, carrying, and/or using physical copies of the event data associated with the events (e.g., coupons, copies of printed advertisements, and/or the like. Additionally or alternatively, such embodiments provide techniques and systems that reduce (e.g., eliminate, decrease, and/or the like) manual efforts and reduce time spent remembering and/or using promotional codes associated with events (e.g., remembering and/or typing in the promotional codes associated with the event and/or the like). Additionally or alternatively, such embodiments provide techniques and systems that enable accurate tracking of how many users are presented with the information about events in media content and/or determining how many users take advantage of (e.g., redeem, benefit from, and/or the like) such events based on the media content. Additionally or alternatively, such embodiments provide techniques and systems that enable accurate extraction of keywords from media content using natural language processing, optical character recognition, and/or the like. Additionally or alternatively, such embodiments provide techniques and systems that enable secure, trackable transactions using (special-purpose) tokens (e.g., in place of account identifiers, in place of general purpose tokens, and/or the like). Additionally or alternatively, such embodiments provide techniques and systems that enable secure, trackable transactions using short-range wireless communication (e.g., via NFC, Bluetooth® Low Energy (BLE), and/or the like), e.g., for communicating such (special-purpose) tokens and/or the like. Additionally or alternatively, such embodiments provide techniques and systems that enable more efficient determination of relevant events (e.g., based on keywords extracted from media content) through use of a centralized event system/database. Additionally or alternatively, such embodiments provide techniques and systems that enable more efficient extraction of keywords from media content and/or determination of relevant events using virtual assistants (e.g., Siri®, Alexa®, Google Assistant™, and/or the like), Internet of things (IoT) devices, smart vehicles (e.g., vehicle on-board systems, such as in connected automobiles, connected cars, connected trucks, Visa Connected Cars, and/or the like), and/or the like. Additionally or alternatively, such embodiments provide techniques and systems that enable more efficient use of and/or tracking of tokens generated for such events (e.g., automatic location-based use of and/or tracking of and/or the like) using smart mobile devices (e.g., cellular phones, smart phones, wearable devices (e.g., watches, glasses, lenses, clothing, and/or the like), PDAs, and/or the like), smart vehicles (e.g., vehicle on-board systems, such as in connected automobiles, connected cars, connected trucks, Visa Connected Cars, and/or the like), and/or the like.

For the purpose of illustration, in the following description, while the presently disclosed subject matter is described with respect to systems, methods, and computer program products for provisioning a token, e.g., based on media content, one skilled in the art will recognize that the disclosed subject matter is not limited to the illustrative embodiments. For example, the methods, systems, and computer program products described herein may be used with a wide variety of settings, such as provisioning a token in any suitable setting, e.g., in-store payment transactions (e.g., via a POS system at a location of a merchant), online payment transactions (e.g., via a website of a merchant on the Internet), interactions with printed content (e.g., coupons, advertisements, flyers, and/or the like), interactions with electronic content (e.g., via a website, a search engine, a mobile application, and/or the like), and/or the like.

Referring now to FIG. 1, FIG. 1 is a diagram of a non-limiting embodiment of an environment 100 in which systems, products, and/or methods, as described herein, may be implemented. As shown in FIG. 1, environment 100 may include transaction service provider system 102*a*, comprehension system 102*b*, issuer system 104, customer device 106*a*, publisher system 106*b*, merchant system 108, acquirer system 110, event system 112*a*, event database 112*b*, and/or network 114.

Transaction service provider system 102*a* may include one or more devices capable of receiving information from and/or communicating information to, comprehension system 102*b*, issuer system 104, customer device 106*a*, publisher system 106*b*, merchant system 108, acquirer system 110, event system 112*a*, and/or event database 112*b* (e.g., via network 114 and/or the like). For example, transaction service provider system 102*a* may include a computing device, such as a server (e.g., a transaction processing server), a group of servers, and/or other like devices. In some non-limiting embodiments, transaction service provider system 102*a* may be associated with a transaction service provider, as described herein. In some non-limiting embodiments, transaction service provider system 102*a* may be in communication with a data storage device, which may be local or remote to transaction service provider system 102a. In some non-limiting embodiments, transaction service provider system 102a may be capable of receiving information from, storing information in, communicating information to, or searching information stored in the data storage device. In some non-limiting embodiments, transaction service provider system 102a may include and/or be a part of comprehension system 102b. In some non-limiting embodiments, transaction service provider system 102a may include and/or be a part of event system 112a and/or event database 112b.

Comprehension system 102b may include one or more devices capable of receiving information from and/or communicating information to transaction service provider system 102a, issuer system 104, customer device 106a, publisher system 106b, merchant system 108, acquirer system 110, event system 112a, and/or event database 112b (e.g., via network 114 and/or the like). For example, comprehension system 102b may include a computing device, such as a server, a group of servers, and/or other like devices. In some non-limiting embodiments, comprehension system 102b may be associated with a transaction service provider, as described herein. In some non-limiting embodiments, comprehension system 102b may be in communication with a data storage device, which may be local or remote to comprehension system 102b. In some non-limiting embodiments, comprehension system 102b may be capable of receiving information from, storing information in, communicating information to, or searching information stored in the data storage device. In some non-limiting embodiments, comprehension system 102b may include and/or be a part of transaction service provider system 102a. In some non-limiting embodiments, comprehension system 102b may include and/or be a part of event system 112a and/or event database 112b.

Issuer system 104 may include one or more devices capable of receiving information from and/or communicating information to transaction service provider system 102a, comprehension system 102b, customer device 106a, publisher system 106b, merchant system 108, acquirer system 110, event system 112a, and/or event database 112b (e.g., via network 114 and/or the like). For example, issuer system 104 may include a computing device, such as a server, a group of servers, and/or other like devices. In some non-limiting embodiments, issuer system 104 may be associated with an issuer institution as described herein. For example, issuer system 104 may be associated with an issuer institution that issued a credit account, debit account, credit card, debit card, portable financial device, and/or the like to a user associated with customer device 106a.

Customer device 106a may include one or more devices capable of receiving information from and/or communicating information to transaction service provider system 102a, comprehension system 102b, issuer system 104, publisher system 106b, merchant system 108, acquirer system 110, event system 112a, and/or event database 112b (e.g., via network 114 and/or the like). Additionally or alternatively, each customer device 106a may include a device capable of receiving information from and/or communicating information to other customer devices 106a (e.g., via network 114 and/or the like). For example, customer device 106a may include a client device and/or the like. In some non-limiting embodiments, customer device 106a may include at least one computing device, e.g., one or more computers, portable computers, laptop computers, tablet computers, mobile devices, cellular phones, wearable devices (e.g., watches, glasses, lenses, clothing, and/or the like), PDAs, Internet of things (IoT) devices, vehicle on-board systems (e.g., of connected vehicles, such as connected automobiles, connected cars, connected trucks, Visa Connected Cars, and/or the like), and/or the like. In some non-limiting embodiments, customer device 106a may or may not be capable of receiving information (e.g., from publisher system 106b, merchant system 108, and/or another customer device 106a) via a short-range wireless communication connection (e.g., an NFC communication connection, an RFID communication connection, a Bluetooth® communication connection, a Bluetooth® Low Energy (BLE) connection, a Zigbee® communication connection, and/or the like), and/or communicating information (e.g., to publisher system 106b, merchant system 108, and/or another customer device 106a) via a short-range wireless communication connection. In some non-limiting embodiments, each customer device 106a may include a device capable of receiving a special purpose token, as described herein. In some non-limiting embodiments, customer device 106a may include and/or be a part of publisher system 106b.

Publisher system 106b may include one or more devices capable of receiving information from and/or communicating information to transaction service provider system 102a, comprehension system 102b, issuer system 104, customer device 106a, merchant system 108, acquirer system 110, event system 112a, and/or event database 112b (e.g., via network 114 and/or the like). Additionally or alternatively, each publisher system 106b may include a device capable of receiving information from and/or communicating information to other publisher systems 106b (e.g., via network 114 and/or the like). In some non-limiting embodiments, each publisher system 106b may include a computing device, such as a server, a group of servers, a client device, a group of client devices, and/or other like devices. Additionally or alternatively, publisher system 106b may include at least one computing device, e.g., one or more computers, portable computers, laptop computers, tablet computers, mobile devices, cellular phones, wearable devices (e.g., watches, glasses, lenses, clothing, and/or the like), PDAs, Internet of things (IoT) devices, connected vehicles (e.g., automobiles, cars, trucks, Visa Connected Cars, and/or the like), and/or the like. In some non-limiting embodiments, publisher system 106b may or may not be capable of receiving information (e.g., from customer device 106a, merchant system 108, and/or another publisher system 106b) via a short-range wireless communication connection (e.g., an NFC communication connection, an RFID communication connection, a Bluetooth® communication connection, a Bluetooth® Low Energy (BLE) connection, a Zigbee® communication connection, and/or the like), and/or communicating information (e.g., to customer device 106a, merchant system 108, and/or another publisher system 106b) via a short-range wireless communication connection. In some non-limiting embodiments, each publisher system 106b may include a device capable of presenting (e.g., playing, displaying, outputting, transmitting, and/or the like) at least one media item, as described herein. In some non-limiting embodiments, publisher system 106b may include and/or be a part of customer device 106a.

In some non-limiting embodiments, publisher system 106b may be associated with at least one publisher (e.g., at least one merchant institution, at least one issuer institution, at least one acquirer institution, at least one manufacturing institution, at least one service providing institution, at least one advertising agency, at least one search engine providing institution, at least one website provider, at least one mobile application provider, any combination thereof, and/or the like), as described herein. For example, a publisher may be any entity that is interacting with a user, communicating with/to a user, collecting data from a user, communicating messages (e.g., associated with events, advertisements, offers, and/or the like) to a user, and/or the like, as described herein. In some non-limiting embodiments, publisher system 106b may include one or more client devices. In some non-limiting embodiments, publisher system 106b may include one or more devices, such as computers, computer systems, and/or peripheral devices capable of being used by a publisher to conduct an interaction with a user.

Merchant system 108 may include one or more devices capable of receiving information from and/or communicating information to transaction service provider system 102a, comprehension system 102b, issuer system 104, customer device 106a, publisher system 106b, acquirer system 110, event system 112a, and/or event database 112b (e.g., via network 114 and/or the like). Merchant system 108 may also include a device capable of receiving information from customer device 106a and/or publisher system 106b via a short-range wireless communication connection (e.g., an NFC communication connection, an RFID communication connection, a Bluetooth® communication connection, a Bluetooth® Low Energy (BLE) connection, a Zigbee® communication connection, and/or the like), and/or communicating information to customer device 106a and/or publisher system 106b via the short-range wireless communication connection. In some non-limiting embodiments, merchant system 108 may include a computing device, such as a server, a group of servers, a client device, a group of client devices, and/or other like devices. In some non-limiting embodiments, merchant system 108 may be associated with a merchant, as described herein. Additionally or alternatively, merchant system 108 may be associated with at least one event organizer (e.g., merchant institution, issuer institution, acquirer institution, manufacturing institution, service providing institution, advertising agency, search engine providing institution, website provider, mobile application provider, reward sponsor, any combination thereof, and/or the like), as described herein. For example, an event organizer may be any entity that manages (e.g., runs, promotes, oversees, and/or the like) an event (e.g., sale, offer, discount, reward, advertisement campaign, and/or the like). In some non-limiting embodiments, merchant system 108 may include one or more client devices. For example, merchant system 108 may include a client device that allows a merchant to communicate information to transaction service provider system 102a. In some non-limiting embodiments, merchant system 108 may include one or more devices, such as computers, computer systems, and/or peripheral devices capable of being used by a merchant to conduct a transaction with a user. For example, merchant system 108 may include a POS device and/or a POS system.

Acquirer system 110 may include one or more devices capable of receiving information from and/or communicating information to transaction service provider system 102a, comprehension system 102b, issuer system 104, customer device 106a, publisher system 106b, merchant system 108, event system 112a, and/or event database 112b (e.g., via network 114 and/or the like). For example, acquirer system 110 may include a computing device, a server, a group of servers, and/or the like. In some non-limiting embodiments, acquirer system 110 may be associated with an acquirer as described herein.

Event system 112a may include one or more devices capable of receiving information from and/or communicating information to transaction service provider system 102a, comprehension system 102b, issuer system 104, customer device 106a, publisher system 106b, merchant system 108, acquirer system 110, and/or event database 112b (e.g., via network 114 and/or the like). For example, event system 112a may include a computing device, a server, a group of servers, and/or the like. In some non-limiting embodiments, event system 112a may provide (e.g., communicate and/or the like) event data associated with at least one event (e.g., sale, offer, discount, reward, advertisement campaign, and/or the like), as described herein. In some non-limiting embodiments, event system 112a may be associated with a transaction service provider, as described herein. Additionally or alternatively, event system 112a may be associated with at least one advertising network, e.g., an entity that connects at least one event organizer event organizer (e.g., merchant institution, issuer institution, acquirer institution, manufacturing institution, service providing institution, advertising agency, search engine providing institution, website provider, mobile application provider, reward sponsor, any combination thereof, and/or the like) and at least one targeted audience (e.g., group of users and/or the like) of such event organizer(s). In some non-limiting embodiments, event system 112a may be in communication with a data storage device (e.g., event database 112b and/or the like), which may be local or remote to event system 112a. In some non-limiting embodiments, event system 112a may be capable of receiving information from, storing information in, communicating information to, or searching information stored in the data storage device (e.g., event database 112b and/or the like). In some non-limiting embodiments, event system 112a may include and/or be a part of transaction service provider system 102a and/or comprehension system 102b. In some non-limiting embodiments, transaction service provider system 102a may include and/or be a part of event database 112b.

Event database 112b may include one or more devices capable of receiving information from and/or communicating information to transaction service provider system 102a, comprehension system 102b, issuer system 104, customer device 106a, publisher system 106b, merchant system 108, acquirer system 110, and/or event system 112a (e.g., via network 114 and/or the like). For example, event database 112b may include a computing device, a server, a group of servers, and/or the like. In some non-limiting embodiments, event database 112b may store event data associated with a plurality of events (e.g., sales, offers, discounts, rewards, advertisement campaigns, and/or the like), as described herein. For example, such events may be provided by (e.g., communicated from and/or the like) at least one event organizer (e.g., merchant institution (e.g., via merchant system 108), issuer institution (e.g., via issuer system 104), acquirer institution (e.g., via acquirer system 110), manufacturing institution, service providing institution, advertising agency, search engine providing institution, website provider, mobile application provider, reward sponsor, any combination thereof, and/or the like).

Network 114 may include one or more wired and/or wireless networks. For example, such networks may include a cellular network (e.g., a long-term evolution (LTE) network, a third generation (3G) network, a fourth generation (4G) network, a fifth generation (5G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network (e.g., a private network associated with a transaction service provider), an ad hoc network, an intranet, the Internet, a fiber optic-based network, a cloud computing network, and/or the like, and/or a combination of these or other types of networks.

In some non-limiting embodiments, any combination of transaction service provider system 102a, comprehension system 102b, event system 112a, and/or event database 112b may be implemented (e.g., completely, partially, and/or the like) by a single system (e.g., a server, a group of servers, and/or other like devices). For example, in some non-limiting embodiments, transaction service provider system 102a, comprehension system 102b, event system 112a, and event database 112b may all be implemented (e.g., completely, partially, and/or the like) by a single system.

In some non-limiting embodiments, any combination of customer device 106a, publisher system 106b, and/or comprehension system 102b may be implemented (e.g., completely, partially, and/or the like) by a single device (e.g., a computing device, such as a server, a computer, a portable computer, a laptop computer, a tablet computer, a mobile device, a cellular phone, a wearable device, a PDA, an IoT device, and/or the like). For example, in some non-limiting embodiments, customer device 106a and publisher system 106b may be implemented (e.g., completely, partially, and/or the like) by a single device. For example, in some non-limiting embodiments, customer device 106a, publisher system 106b, and comprehension system 102b may all be implemented (e.g., completely, partially, and/or the like) by a single device.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally or alternatively, a set of systems (e.g., one or more systems) or a set of devices (e.g., one or more devices) of environment 100 may perform one or more functions described as being performed by another set of systems or another set of devices of environment 100.

Figure 2:
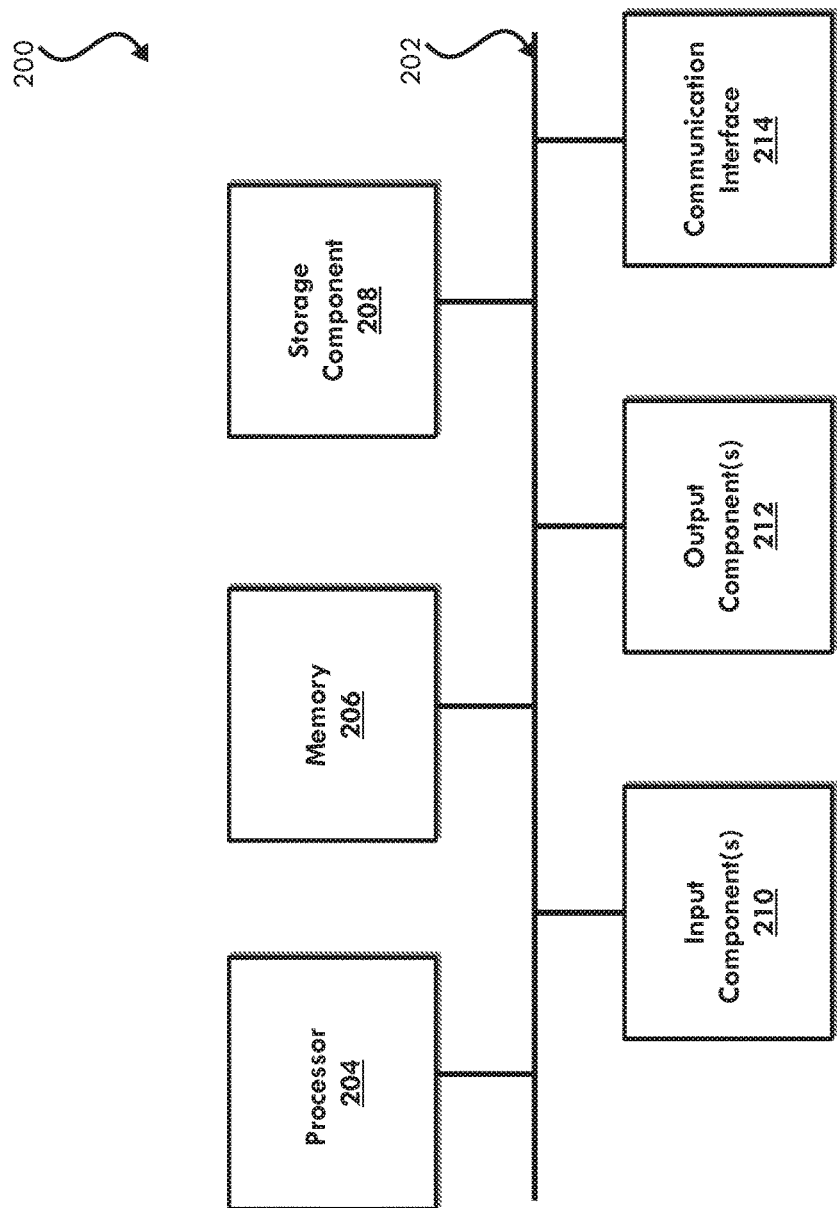
FIG. 2 is a diagram of a non-limiting embodiment of components of one or more devices of FIG. 1.

Referring now to FIG. 2, FIG. 2 is a diagram of example components of a device 200. Device 200 may correspond to one or more devices of transaction service provider system 102a, comprehension system 102b, issuer system 104, customer device 106a, publisher system 106b, merchant system 108, acquirer system 110, event system 112a, and/or event database 112b. In some non-limiting embodiments, transaction service provider system 102a, comprehension system 102b, issuer system 104, customer device 106a, publisher system 106b, merchant system 108, acquirer system 110, event system 112a, and/or event database 112b may include at least one device 200 and/or at least one component of device 200. As shown in FIG. 2, device 200 may include bus 202, processor 204, memory 206, storage component 208, input component(s) 210, output component(s) 212, and communication interface 214.

Bus 202 may include a component that permits communication among the components of device 200. In some non-limiting embodiments, processor 204 may be implemented in hardware, software, or a combination of hardware and software. For example, processor 204 may include a processor (e.g., a central processing unit (CPU), a graphics processing unit (GPU), an accelerated processing unit (APU), and/or the like), a microprocessor, a digital signal processor (DSP), and/or any processing component (e.g., a field-programmable gate array (FPGA), an application-specific integrated circuit (ASIC), and/or the like), and/or the like, which can be programmed to perform a function. Memory 206 may include random access memory (RAM), read-only memory (ROM), and/or another type of dynamic or static storage device (e.g., flash memory, magnetic memory, optical memory, and/or the like) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of computer-readable medium, along with a corresponding drive.

Input component(s) 210 may include a component that permits device 200 to receive information, such as via user input (e.g., a touch screen display, a keyboard, a keypad, a mouse, a button, a switch, a microphone, a camera, and/or the like). Additionally or alternatively, input component(s) 210 may include a sensor for sensing information (e.g., a global positioning system (GPS) component, an accelerometer, a gyroscope, an actuator, and/or the like). Output component(s) 212 may include a component that provides output information from device 200 (e.g., a display, a speaker, one or more light-emitting diodes (LEDs), and/or the like).

Communication interface 214 may include a transceiver-like component (e.g., a transceiver, a receiver and transmitter that are separate, and/or the like) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a Bluetooth® interface, a Zigbee® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 2 are provided as an example. In some non-limiting embodiments, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
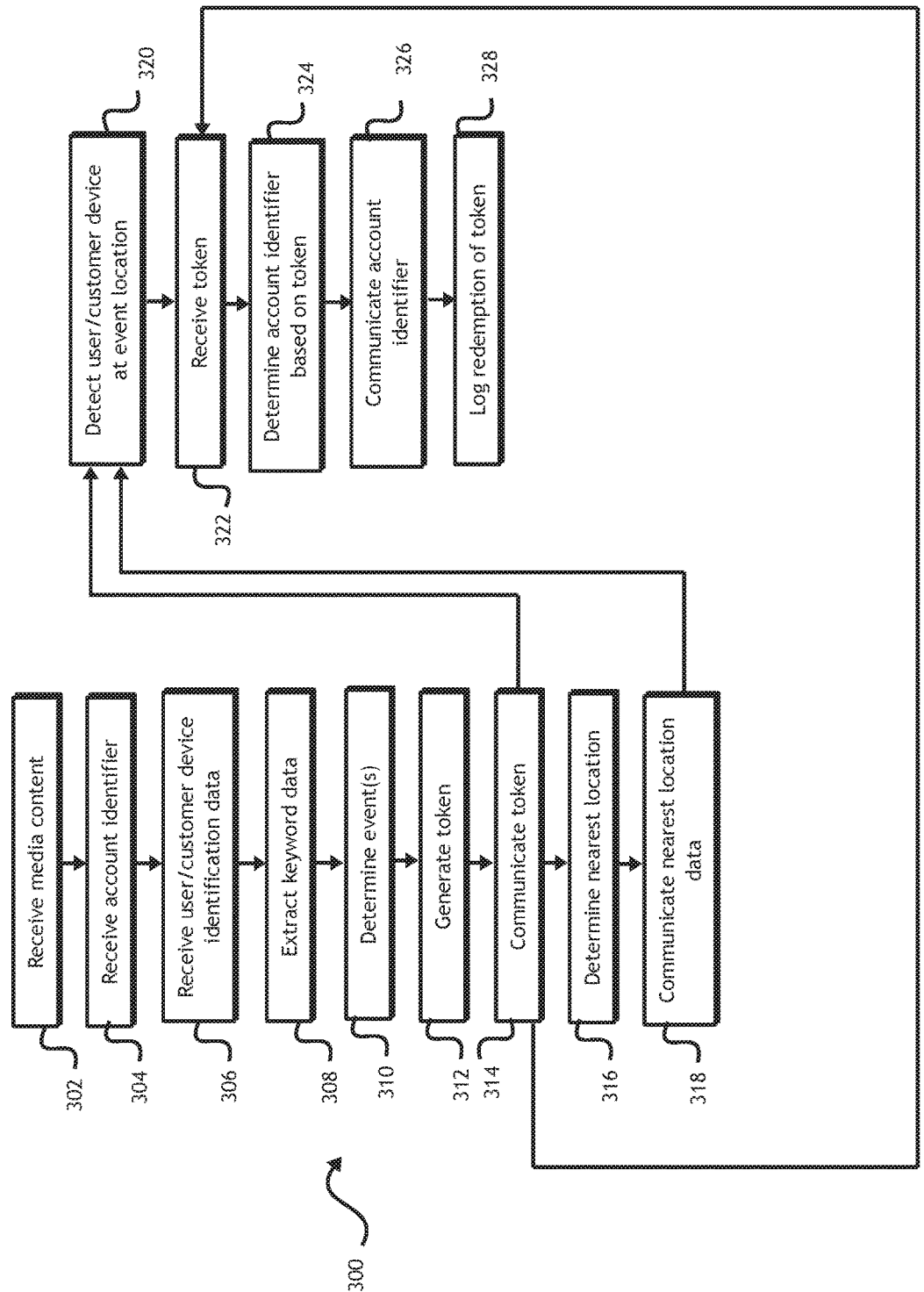
FIG. 3 is a flowchart of a non-limiting embodiment of a process for provisioning a token based on media content, according to the principles of the presently disclosed subject matter.

Referring now to FIG. 3, FIG. 3 is a flowchart of a non-limiting embodiment of a process 300 for provisioning a token based on media content. In some non-limiting embodiments, one or more of the steps of process 300 may be performed (e.g., completely, partially, and/or the like) by comprehension system 102*b*. In some non-limiting embodiments, one or more of the steps of process 300 may be performed (e.g., completely, partially, and/or the like) by another system, another device, another group of systems, or another group of devices, separate from or including comprehension system 102*b*, such as transaction service provider system 102*a*, issuer system 104, customer device 106*a*, publisher system 106*b*, merchant system 108, acquirer system 110, event system 112*a*, event database 112*b*, and/or the like.

As shown in FIG. 3, at step 302, process 300 may include receiving media content. For example, comprehension system 102*b* may receive media content data associated with media content (e.g., from customer device 106*a*, publisher system 106*b*, and/or the like).

In some non-limiting embodiments, comprehension system 102*b* may receive media content data associated with media content from customer device 106*a*. For example, media content data may include at least one of audio data, visual data, audiovisual data, any combination thereof, and/or the like.

For the purpose of illustration, publisher system 106*b* may present (e.g., play, display, output, transmit to customer device 106*a*, and/or the like) media content (e.g., audio content such as podcasts, and/or radio shows; visual content such as web pages; audiovisual content such as videos, televisions shows, and/or movies; and/or the like). Additionally or alternatively, customer device 106*a* may capture (e.g., record, receive via input components (e.g., microphone, camera, and/or the like), store, screenshot, and/or the like) at least a portion of the media content, as described herein. Additionally or alternatively, customer device may communicate (e.g., transmit and/or the like) media content data associated with the captured (portion of) the media content to comprehension system 102*b*.

In some non-limiting embodiments, the media content data may include metadata. For example, at least one of customer device 106*a* and/or publisher system 106*b* may determine the metadata and/or include the metadata with the media content data (e.g., incorporate the metadata with and/or append the metadata to data representing the media content to form media content data that includes the metadata and/or the like). For example, the metadata may be associated with at least one of a time of the media content (e.g., a time that the media content was presented, a time that the media content was created, and/or the like) or a location of the media content (e.g., a location of the publisher system 106*b* presenting the media content, a location of the customer device 106*a* receiving/capturing the media content, and/or the like).

In some non-limiting embodiments, the media content may include at least one command. For the purpose of illustration, if the media content includes audio data (and/or audiovisual data), the media content may include a wakeup word, a predetermined word and/or sound, and/or the like that may be associated with a command to begin capturing the media content. For the purpose of illustration, if the media content includes visual data (and/or audiovisual data), the media content may include a graphical element (e.g., symbol, text, barcode, QR code, and/or the like) associated with a command to begin capturing the media content. For the purpose of illustration, if the media content includes audio data (and/or audiovisual data), a user (e.g., customer associated with customer device 106*a* and/or the like) may speak a wakeup word, a predetermined word, and/or the like that may be associated with a command to begin capturing the media content.

In some non-limiting embodiments, the command(s) may be detected. For example, customer device 106*a* (and/or publisher system 106*b*) may detect the command(s) based on the media content. For example, customer device 106*a* (and/or publisher system 106*b*) may include a buffer (e.g., first in, first out (FIFO) buffer and/or the like) storing a most recent portion of the media content (e.g., up to the buffer size and/or the like). Additionally or alternatively, customer device 106*a* (and/or publisher system 106*b*) may analyze a most recent portion of the media content (e.g., using at least one of speech recognition, natural language processing (NLP), image detection, optical character recognition (OCR), any combination thereof, and/or the like) to extract the command(s) from the most recent portion of the media content. In some non-limiting embodiments, customer device 106*a* (and/or publisher system 106*b*) may capture media content data associated with the media content for a first time period (e.g., preselected time period, time period up to the buffer size, and/or the like) after detecting the command(s). In some non-limiting embodiments, customer device 106*a* (and/or publisher system 106*b*) may communicate (e.g., transmit) the media content data (e.g., to comprehension system 102*b* and/or the like).

In some non-limiting embodiments, comprehension system 102*b* may receive (e.g., from customer device 106*a*, publisher system 106*b*, and/or the like) a request to share the media content data (and/or event data associated with at least one event associated with the media content data, as described herein) with a second user (e.g., a second customer associated with a second customer device 106*a* and/or the like). For example, a first user (e.g., of a first customer device 106*a* and/or the like) may provide input to first customer device 106*a* associated with a request to share the media content data (and/or event data associated therewith, as described herein) with a second user (e.g., of a second customer device 106*a* and/or the like). For the purpose of illustration, if the media content includes audio data (and/or audiovisual data), a first user (e.g., of a first customer device 106*a* and/or the like) may speak a wakeup word, a predetermined word, and/or the like that may be associated with a request to share the media content (and/or event data associated therewith, as described herein) with a second user (e.g., of a second customer device 106*a* and/or the like).

As shown in FIG. 3, at step 304, process 300 may include receiving account identifier data. For example, comprehension system 102*b* may receive account identifier data associated with an account identifier of the user (e.g., customer), e.g., from customer device 106*a*, publisher system 106*b*, and/or the like.

In some non-limiting embodiments, comprehension system 102*b* may receive account identifier data associated with an account identifier of a first user (e.g., a first customer associated with a first customer device 106*a*).

In some non-limiting embodiments, the account identifier data may include a general-purpose payment token (e.g., as provisioned to and/or stored on customer device 106a and/or the like).

In some non-limiting embodiments, the account identifier data may include device identification data associated with at least one device associated with the user (e.g., customer device 106a associated with the user (e.g., customer), publisher system 106b associated with the user (e.g., customer), and/or the like. For example, the account identifier data may include customer device identification data associated with customer device 106a of the user (e.g., customer). Additionally or alternatively, the account identifier data may be associated with a device of publisher system 106b associated with the user (e.g., customer). In some non-limiting embodiments, comprehension system 102b may include (e.g., store and/or the like) a mapping of the device identification data (e.g., customer device identification data, publisher system device identification data, and/or the like) with at least one other account identifier (e.g., general-purpose payment token, PAN, and/or the like) associated with the device identification data. Additionally or alternatively, comprehension system 102b may determine such other account identifier(s) based on receiving the device identification data (e.g., from customer device 106a, publisher system 106b, and/or the like).

In some non-limiting embodiments, if comprehension system 102b receives a request to share the media content data (and/or event data associated therewith, as described herein) with a second user (e.g., of a second customer device 106a and/or the like), comprehension system 102b may receive second account identifier data associated with a second account identifier of a second user (e.g., second customer), e.g., from first customer device 106a and/or publisher system 106b. For example, the second account identifier may include a second general purpose payment token associated with the second user (e.g., second customer). Additionally or alternatively, the second account identifier may include second device identification data (e.g., second customer device identification data associated with a second customer device 106a of the second customer).

As shown in FIG. 3, at step 306, process 300 may include receiving customer device identification data. For example, comprehension system 102b may receive customer device identification data associated with customer device 106a (e.g., from customer device 106a, publisher system 106b, and/or the like).

In some non-limiting embodiments, comprehension system 102b may receive first customer device identification data associated with a first customer device 106a of the first user (e.g., customer) from the first customer device 106a. Additionally or alternatively, comprehension system 102b may receive first customer device identification data associated with a first customer device 106a of the first user (e.g., customer) from publisher system 106b.

In some non-limiting embodiments, the first user device 106a may include at least one of a mobile device, a vehicle on-board system (e.g., of a connected automobile and/or the like), a networked device, any combination thereof, and/or the like. Additionally or alternatively, publisher system 106b may include an IoT device, a hardware virtual assistant (e.g. Amazon Echo®, Google Home®), a virtual assistant (e.g., Siri®, Alexa®, Google Assistant™, and/or the like) implemented on a customer device 106a, and/or the like. In some non-limiting embodiments, comprehension system 102b may receive first customer device identification data associated with a first customer device 106a (e.g., mobile device, vehicle onboard system, and/or the like) as well as media content data and/or account identification data from publisher system 106b (e.g., IoT device, virtual assistant, and/or the like). Additionally or alternatively, comprehension system 102b may receive first customer device identification data associated with a first customer device 106a from publisher system 106b and/or may (separately) receive media content data and/or account identification data from the first customer device 106a.

In some non-limiting embodiments, if comprehension system 102b receives a request to share the media content data (and/or event data associated therewith, as described herein) with a second user (e.g., of a second customer device 106a and/or the like), comprehension system 102b may receive second user device identification data associated with a second user device 106a of the second user (e.g., customer), e.g., from first customer device 106a and/or publisher system 106b.

As shown in FIG. 3, at step 308, process 300 may include extracting keyword data. For example, comprehension system 102b may extract keyword data from the media content.

In some non-limiting embodiments, comprehension system 102b may extract keyword data associated with at least one keyword from the media content (and/or media content data associated therewith). Additionally or alternatively, comprehension system 102b may extract keyword data from (e.g., based on) metadata associated with (e.g., included in and/or the like) the media content data.

In some non-limiting embodiments, the at least one keyword may include at least one of an offer term, a participating merchant, a participating issuer, an eligible account type, any combination thereof, and/or the like. Additionally or alternatively, the keyword(s) may include any word (and/or other value, category, and/or the like) stored in the event database 112b.

For the purpose of illustration, if the media content data includes audio data, extracting the keyword data may include extracting (e.g., by comprehension system 102b and/or the like) word data associated with at least one word from the media content using at least one of speech recognition, natural language processing, any combination thereof, and/or the like. Additionally or alternatively, comprehension system 102b may determine the keyword(s) based at least partially on the word(s) extracted from the media content.

As shown in FIG. 3, at step 310, process 300 may include determining at least one event. For example, comprehension system 102b may determine at least one event (e.g., sale, offer, discount, reward, advertisement campaign, and/or the like) based on the keyword(s) (and/or keyword data associated therewith).

In some non-limiting embodiments, comprehension system 102b may determine at least one event (e.g., sale, offer, discount, reward, advertisement campaign, and/or the like) based at least partially on the keyword data and/or event data (e.g., stored in event database 112b, received from event system 112a, and/or the like). For the purpose of illustration, comprehension system 102b may communicate (e.g., transmit and/or the like) the keyword(s) to event system 112a, which may determine at least one event from event database 112b based on the keyword(s) (e.g., based on natural language processing, fuzzy matching, and/or the like). Additionally or alternatively, event system 112a may communicate (e.g., transmit and/or the like) event data (e.g., retrieved from event database 112b based on the determined event(s)) to comprehension system 102b.

In some non-limiting embodiments, the media content data may further include metadata (e.g., associated with at least one of a time or a location of the media content), as described herein. Additionally or alternatively, determining the event(s) may include determining the event(s) based at least partially on the metadata and/or the keyword data.

In some non-limiting embodiments, the event data may include at least one redemption requirement (e.g., a set of redemption requirements, a plurality of redemption requirements, and/or the like) associated with the event. For example, the redemption requirement(s) may include at least one of an offer term, a participating merchant, a participating issuer, an eligible account type, any combination thereof, and/or the like.

As shown in FIG. 3, at step 312, process 300 may include generating a token. For example, comprehension system 102b may generate a token based on the event(s) and/or the account identifier data. Additionally or alternatively, comprehension system 102b may store a mapping of the token (e.g., as generated) to the account identifier.

In some non-limiting embodiments, comprehension system 102b may generate a token based at least partially on the event(s) and the first account identifier data associated with the first user (e.g., first customer). Additionally or alternatively, comprehension system 102b may store a mapping of the token (e.g., as generated) to the first account identifier.

In some non-limiting embodiments, comprehension system 102b may determine a PAN of the first user based on the account identifier data. Additionally or alternatively, generating the token may include generating the token based at least partially on the event and the PAN.

In some non-limiting embodiments, the account identifier data may include a general-purpose payment token, as described herein. Additionally or alternatively, the token (e.g., generated by the comprehension system 102b) may include a special-purpose payment token associated with the event(s). For example, comprehension system 102b may generate the special-purpose token based on the event(s) and the general-purpose payment token. In some non-limiting embodiments, comprehension system 102b may store a mapping of the special-purpose token (e.g., as generated) to the general-purpose token.

For the purpose of illustration, the general-purpose payment token may include a first set of digits having a predetermined number of digits (e.g., a first number having 16 digits and/or the like). For example, the first set of digits may include a first bank identification number (BIN) including a subset of the first set of digits (e.g., six digits, eight digits, and/or the like of the first number). Additionally or alternatively, the special-purpose payment token may include a second set of digits having the predetermined number of digits (e.g., a second number having 16 digits and/or the like). The second set of digits may include a second BIN including a subset of the second set of digits (e.g., six digits, eight digits, and/or the like of the second number). Additionally or alternatively, the second BIN may be different than the first BIN. In some non-limiting embodiments, generating the special-purpose payment token may include comprehension system 102b replacing the first BIN with the second BIN (e.g., and copying the remaining digits of the first set of digits (e.g., other than the first BIN) to the second set of digits).

In some non-limiting embodiments, the first set of digits (e.g., of the general-purpose payment token) may include a first set of remaining digits other than the first BIN. Additionally or alternatively, the second set of digits (e.g., of the special-purpose payment token) may include a second set of remaining digits other than the second BIN. In some non-limiting embodiments, comprehension system 102b may determine the second set of remaining digits by masking the first set of remaining digits (e.g., separately from and/or in addition to replacing the first BIN with the second BIN, as described herein). For the purpose of illustration, masking the first set of remaining digits may include determining (e.g., by comprehension system 102b) a four-bit representation for each digit of the first set of remaining digits. Additionally or alternatively, comprehension system 102b may determine a four-bit masked representation for each digit of the first set of remaining digits by combining the four-bit representation with a code using at least one logic gate (e.g., as further described below). Additionally or alternatively, comprehension system 102b may determine the second set of remaining digits based on the four-bit masked representation for each digit of the first set of remaining digits (e.g., by converting each four-bit masked representation back to a digit).

In some non-limiting embodiments, comprehension system 102b and/or transaction service provider system 102a may determine a plurality of PANs associated with the account identifier. Additionally or alternatively, comprehension system 102b, transaction service provider system 102a, and/or event system 112a may determine a potential reward associated with each PAN of the plurality of PANs (e.g., based on the event data associated with the event from event database 112b, the respective PAN, and/or the like). Additionally or alternatively, comprehension system 102b, transaction service provider system 102a, and/or event system 112a may select a PAN of the plurality of PANs corresponding to a greatest potential reward. In some non-limiting embodiments, comprehension system 102b may generate the token (e.g., special-purpose payment token and/or the like) based on the event(s) and the PAN of the plurality of PANs corresponding to the greatest potential reward (and/or a general-purpose token associated with such PAN).

In some non-limiting embodiments, the account identifier data may include customer device identification data associated with customer device 106a (e.g., first customer device 106a associated with the first user, second customer device 106a associated with a second user separate from the first user, and/or the like). Additionally or alternatively, the token (e.g., generated by comprehension system 102b) may include a payment token.

In some non-limiting embodiments, if comprehension system 102b receives a request to share the media content data (and/or event data associated therewith, as described herein) with a second user (e.g., of a second customer device 106a and/or the like), comprehension system 102b may generate a token (e.g., second token and/or the like) based on the event data and second account identifier data associated with the second user (e.g., customer).

As shown in FIG. 3, at step 314, process 300 may include communicating the token. For example, comprehension system 102b may communicate the token (e.g., to customer device 106a and/or the like).

In some non-limiting embodiments, comprehension system 102b may communicate the token to a first customer device 106a (e.g., associated with a first user/customer) based at least partially on the first customer device identification data.

In some non-limiting embodiments, if comprehension system 102b receives a request to share the media content data (and/or event data associated therewith, as described herein) with a second user (e.g., of a second customer device 106a and/or the like), comprehension system 102b may communicate the token (e.g., second token and/or the like) to the second user device based at least partially on the second customer device identification data.

As shown in FIG. 3, at step 316, process 300 may include determining at least one nearby location associated with the event(s). For example, comprehension system 102b may determine at least one nearest location associated with the event(s) based on a location of customer device 106a.

In some non-limiting embodiments, comprehension system 102b may receive (e.g., from customer device 106a and/or the like) first customer device location data associated with a current location of a first customer device 106a. Additionally or alternatively, comprehension system 102b may determine at least one nearest location (e.g., the one nearest location, locations within a predetermined distance, and/or the like) associated with the event(s) based on the first customer device location.

In some non-limiting embodiments, the location(s) associated with the event(s) may include location(s) of any participating merchant(s). Additionally or alternatively, the location(s) associated with the event(s) may include location(s) of any participating issuer(s), predetermined location(s), and/or the like.

In some non-limiting embodiments, if comprehension system 102b receives a request to share the media content data (and/or event data associated therewith, as described herein) with a second user (e.g., of a second customer device 106a and/or the like), comprehension system 102b may receive (e.g., from a second customer device 106a and/or the like) second customer device location data associated with a current location of a second customer device 106a. Additionally or alternatively, comprehension system 102b may determine at least one nearest location (e.g., the one nearest location, locations within a predetermined distance, and/or the like) associated with the event(s) based on the second customer device location.

As shown in FIG. 3, at step 318, process 300 may include communicating nearest location data. For example, comprehension system 102b may communicate nearest location data associated with the nearest location(s) associated with the event(s) (e.g., to customer device 106a).

In some non-limiting embodiments, comprehension system 102b may communicate nearest location data associated with the nearest location(s) associated with the event(s) to a first user device 106a (e.g., associated with a first user/customer).

In some non-limiting embodiments, if comprehension system 102b receives a request to share the media content data (and/or event data associated therewith, as described herein) with a second user (e.g., of a second customer device 106a and/or the like), comprehension system 102b may communicate nearest location data associated with the nearest location(s) associated with the event(s) to the second user device 106a (e.g., associated with the second user/customer).

As shown in FIG. 3, at step 320, process 300 may include detecting the customer device at a location associated with at least one of the event(s). For example, comprehension system 102b may detect customer device 106a at a location associated with the event(s).

In some non-limiting embodiments, comprehension system 102b may detect a customer device 106a (e.g., first customer device 106a associated with a first user/customer, second customer device 106a associated with a second user/customer, and/or the like) at a location (e.g., the nearest location, another location, and/or the like) associated with the event(s).

In some non-limiting embodiments, comprehension system 102b may receive (e.g., from customer device 106a and/or the like) customer device location data associated with a current location of customer device 106a. Additionally or alternatively, comprehension system 102b may detect that customer device 106a is at the location associated with the event based on the customer device location data.

In some non-limiting embodiments, customer device 106a may communicate (e.g., via NFC, Bluetooth® Low Energy (BLE), Wi-Fi®, and/or the like) with merchant system 108. Additionally or alternatively, merchant system 108 may communicate customer device location data associated with customer device 106a being within communication range of merchant system 108 to comprehension system 102b.

Additionally or alternatively, comprehension system 102b may detect that customer device 106a is at the location associated with the event based on the customer device location data.

In some non-limiting embodiments, customer device 106a may communicate (e.g., via NFC, Bluetooth® Low Energy (BLE), and/or the like) the token (e.g., special-purpose payment token and/or the like) to merchant system 108. Additionally or alternatively, merchant system 108 may generate an authorization request including the token and communicate the token to comprehension system 102b. Additionally or alternatively, comprehension system 102b may detect that customer device 106a is at the location associated with the event based on the authorization request including the token.

As shown in FIG. 3, at step 322, process 300 may include receiving the token. For example, merchant system 108 may receive the token from customer device 106a. Additionally or alternatively, comprehension system 102b may receive the token (e.g., directly or indirectly from merchant system 108, customer device 106a, and/or the like).

In some non-limiting embodiments, merchant system 108 may receive the token (e.g., special-purpose payment token and/or the like) from the customer device 106a (e.g., first customer device 106a associated with a first user/customer, second customer device 106a associated with a second user/customer, and/or the like). Additionally or alternatively, merchant system 108 (e.g., a POS device thereof, POS system thereof, and/or the like) may generate an authorization request including the token for a transaction (e.g., first transaction).

In some non-limiting embodiments, comprehension system 102b may receive the authorization request including the token (e.g., special-purpose token), e.g., directly or indirectly from merchant system 108. For example, merchant system 108 may communicate the authorization request to acquirer system 110, which may communicate the authorization request (or a second authorization request based on the first authorization request) to transaction service provider system 102a, which may communicate the authorization request (and/or the token included therein) to comprehension system 102b. Additionally or alternatively, comprehension system 102b may receive the token (e.g., special-purpose token), e.g., directly or indirectly from customer device 106a. For example, for an online/e-commerce transaction, customer device 106a may communicate the token (e.g., special-purpose token) to transaction service provider system 102a, which may communicate the token to comprehension system 102b.

As shown in FIG. 3, at step 324, process 300 may include determining an account identifier based on the token. For example, comprehension system 102b may determine the account identifier based on the token. In some non-limiting embodiments, comprehension system 102b may determine the account identifier based on the token and the mapping from the token to the account identifier.

In some non-limiting embodiments, comprehension system 102b may determine the first account identifier (e.g., associated with the first user/customer and/or the like) based on the token.

In some non-limiting embodiments, the token may include the special-purpose token. Additionally or alternatively, the received authorization request may include the special-purpose token. In some non-limiting embodiments, comprehension system 102b may determine the general-purpose payment token based on the special-purpose payment token (e.g., based on the mapping from the special-purpose payment token to the general-purpose payment token). Additionally or alternatively, comprehension system 102b and/or transaction service provider system 102a may determine a PAN based on the general-purpose token.

As shown in FIG. 3, at step 326, process 300 may include communicating the account identifier. For example, comprehension system 102b may communicate the account identifier to transaction service provider system 102a. Additionally or alternatively, comprehension system 102b and/or transaction service provider system 102a may communicate the account identifier (and/or a PAN determined based thereon) to issuer system 104.

In some non-limiting embodiments, comprehension system 102b may determine the general-purpose payment token based on the special-purpose payment token (e.g., based on the mapping from the special-purpose payment token to the general-purpose payment token). Additionally or alternatively, comprehension system 102b and/or transaction service provider system 102a may determine a PAN based on the general-purpose token. Additionally or alternatively, comprehension system 102b and/or transaction service provider system 102a may communicate a second authorization request including the PAN to issuer system 104.

As shown in FIG. 3, at step 328, process 300 may include logging redemption of the token. For example, comprehension system 102b may log (e.g., track, store a record of, and/or the like) redemption of the token. In some non-limiting embodiments, comprehension system 102b may determine (e.g., based on the number of stored tokens, the number of mappings associated with generated tokens, and/or the like) the number of tokens generated by comprehension system 102b for each respective event. Additionally or alternatively, comprehension system 102b may determine the number of tokens redeemed for each respective event (e.g., based on the redemptions of tokens logged by comprehension system 102b and/or the like). Additionally or alternatively, comprehension system 102b may determine a conversion rate associated with the tokens generated for each respective event (e.g., the number of redeemed tokens divided by the number of generated tokens, and/or the like).

Figure 4:
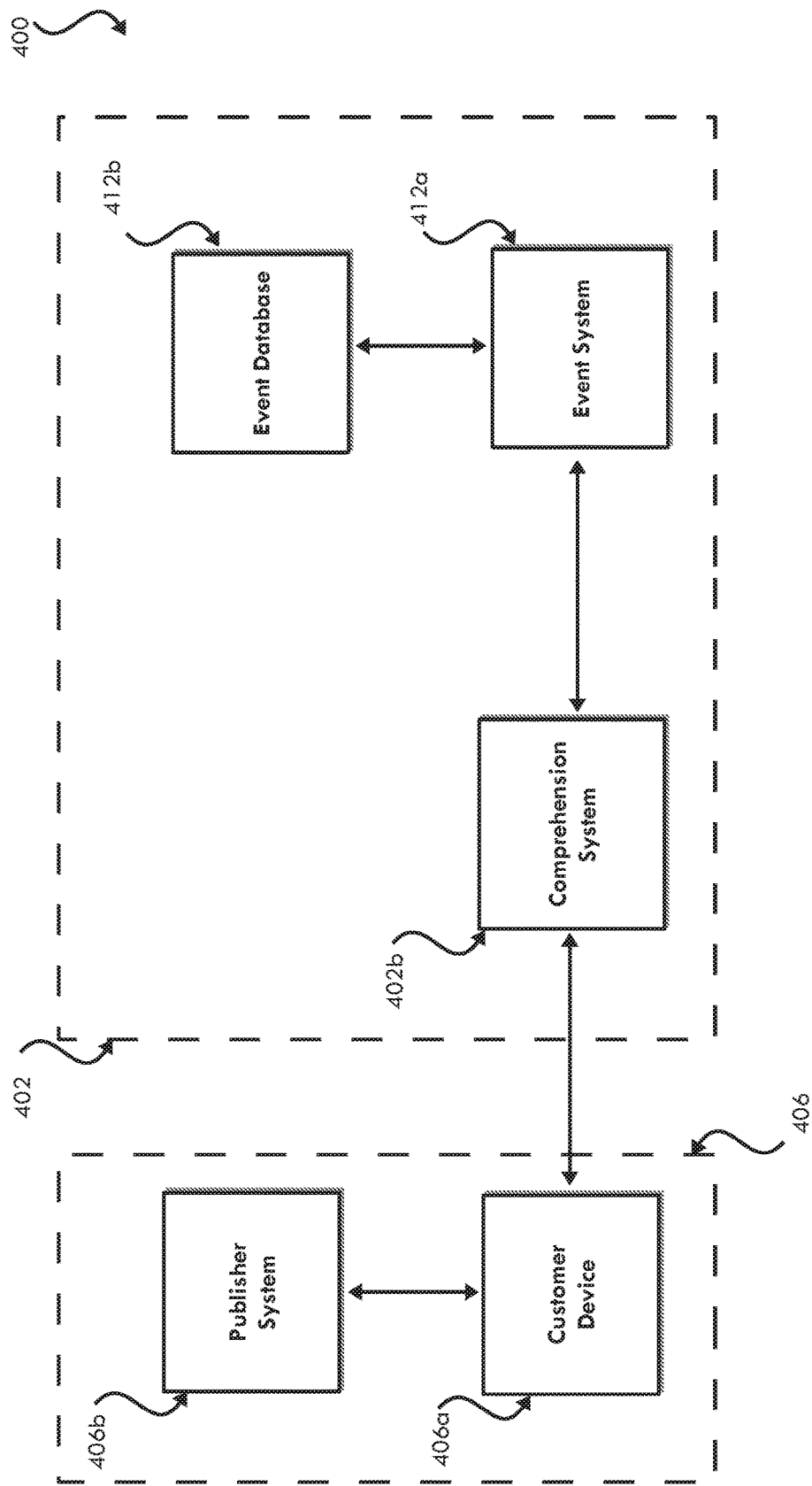
FIG. 4 is a diagram of a non-limiting embodiment of an implementation of a non-limiting embodiment of the process shown in FIG. 3 according to the principles of the presently disclosed subject matter.

Referring now to FIG. 4, FIG. 4 is a diagram of an exemplary implementation 400 of a non-limiting embodiment relating to process 300 shown in FIG. 3. As shown in FIG. 4, implementation 400 may include comprehension system 402b, customer device 406a, publisher system 406b, event system 412a, and/or event database 412b. In some non-limiting embodiments, comprehension system 402b may be the same as or similar to comprehension system 102b. In some non-limiting embodiments, customer device 406a may be the same as or similar to customer device 106a. In some non-limiting embodiments, publisher system 406b may be the same as or similar to publisher system 106b. In some non-limiting embodiments, event system 412a may be the same as or similar to event system 112a. In some non-limiting embodiments, event database 412b may be the same as or similar to event database 112b. In some non-limiting embodiments, any combination of comprehension system 402b, event system 412a, and/or event database 412b may be implemented (e.g., completely, partially, and/or the like) by a single system 402. In some non-limiting embodiments, customer device 406a and publisher system 406b may be implemented (e.g., completely, partially, and/or the like) by a single device 406.

In some non-limiting embodiments, comprehension system 402b may receive media content data, as described herein. For example, a user (e.g., customer) may be observing (e.g., listening to, watching, and/or the like) media content. For the purpose of illustration, the user (e.g., customer) may listen (e.g., via publisher system 406b, customer device 406a, and/or the like) to media content including audio data (e.g., radio, podcast, and/or the like), which may include advertisements. Additionally or alternatively, the media content may be captured (e.g., via customer device 406a, publisher system 406b, and/or the like), e.g., when instructed by the user (e.g., customer), based on set timing (e.g., periodically for a predetermined duration, based on a schedule, during a session, and/or the like), based on commands embedded in the media content, continuously, and/or the like.

For the purpose of illustration, a user (e.g., customer) may listens to media content (e.g., audio content) that includes an advertisement on a device associated with publisher system 406b (e.g., hardware virtual assistant (e.g., Amazon Echo, Google Home, and/or the like), a virtual assistant (e.g., Siri®, Alexa®, Google Assistant™, and/or the like), and/or the like). Additionally or alternatively, the user (e.g., customer) may instruct (e.g., by speaking and/or the like) the device associated with publisher system 406b to save the advertisement for redeeming at a later point (or the device associated with publisher system 406b may listen to the advertisements of the media content periodically, based on a schedule, based on embedded commands therein, continuously, and/or the like). Additionally or alternatively, the device associated with publisher system 406b may capture at least a portion of the media content based on that instruction (or period, command, and/or the like).

In some non-limiting embodiments, the device associated with publisher system 406b may communicate media content data associated with the (portion of) the media content to comprehension system 402b. Additionally or alternatively, the device associated with publisher system 406b may use speech recognition, NLP, and/or the like to identify keywords from the media content (e.g., audio content including a broadcasted/streamed advertisement), and/or the device associated with publisher system 406b may communicate keyword data associated with the identified keywords to comprehension system 402b.

In some non-limiting embodiments, comprehension system 402b may receive the media content data (e.g., associated with the media content containing the advertisement details).

In some non-limiting embodiments, comprehension system 402b may receive at least one account identifier (e.g., one or more tokenized PANs, general purpose tokens, customer device identifiers, and/or the like), as described herein. For example, comprehension system 402b may receive the account identifier from the device associated with publisher system 406b (e.g., if such account identifier is available in the device associated with publisher system

406b). Additionally or alternatively, comprehension system 402b may receive the account identifier from customer device 406a (e.g., a mobile device, a vehicle on-board system, and/or the like), as described herein.

In some non-limiting embodiments, comprehension system 402b may receive customer device identification data associated with customer device 406a (e.g., a mobile device, a vehicle on-board system, and/or the like), e.g., from customer device 406a, the device associated with publisher system 406b, and/or the like, as described herein. Additionally or alternatively, comprehension system 402b may receive customer device location data associated with a current location of customer device 406a, as described herein.

In some non-limiting embodiments, comprehension platform 402b may be connected to multiple customer devices 406b. Additionally or alternatively, comprehension system 402b may alert the primary user (e.g., first customer associated with first customer device 406a) when one of the other connected customer devices requests to upload media content data (and/or keyword data, advertisement data, and/or the like associated therewith) to comprehension system 402b.

In some non-limiting embodiments, comprehension system 402b may extract keyword data from the media content (and/or media content data associated therewith), as described herein. For example, comprehension system 402b may use speech recognition, NLP, and/or the like to extract keywords from the media content (e.g., from advertisements contained therein).

In some non-limiting embodiments, comprehension system 402b may determine at least one event based on the keywords, as described herein. For example, comprehension system 402b may analyze the keywords (e.g., compare the keywords to event data in event database 412b) to determine at least one event (e.g., offer and/or the like) applicable to the user (e.g., customer) based thereof. Additionally or alternatively, comprehension system 402b may communicate (e.g., transmit and/or the like) the keyword(s) to event system 412a, which may determine at least one event from event database 412b based on the keyword(s) (e.g., based on natural language processing, fuzzy matching, and/or the like). Additionally or alternatively, event system 412a may communicate (e.g., transmit and/or the like) event data (e.g., retrieved from event database 412b based on the determined event(s)) to comprehension system 102b.

For the purpose of illustration, identification of keywords may enable determination (e.g., by comprehension system 402b, event system 412a, and/or the like) of at least one of a corresponding participating merchant, an advertisement campaign/program (e.g., buy 1 get 1), a specific sale applicable during a period (e.g., during a time period around a holiday), an offer on specific items (e.g., apparel, certain types of apparel (e.g., kids apparel), and/or the like), at least one participating issuer, specific eligible cards issued by such issuers (e.g., only Platinum Rewards cards offered by a particular issuer), and/or other event data associated with at least one event.

In some non-limiting embodiments, the device associated with publisher system 406b, customer device 406a, and/or the like may capture metadata associated with the media content. For example, metadata may include a time (e.g., timestamp indicating the time the media content and/or advertisement contained therein was being broadcasted/streamed), a location (e.g., the geolocation where the device associated with publisher system 406b, customer device 406a, and/or the like is located indicating the specific location the media content and/or advertisement contained therein was being targeted), and/or other information/details (e.g., that may help differentiate between different events (e.g., different advertising campaigns being conducted by the same merchant and/or the like)).

In some non-limiting embodiments, the device associated with publisher system 406b, customer device 406a, and/or the like may communicate (e.g., transmit) the identified keywords (and/or any metadata) to comprehension system 402b.

In some non-limiting embodiments, comprehension system 402b may use speech recognition, natural language processing, and/or the like over the received media content to identify relevant information such as keywords, metadata, and/or the like. Additionally or alternatively, comprehension system 402b (and/or event system 412a) may determine the event data (e.g., advertisement campaign/program, relevant merchant details, participating issuers, eligible payment products, and/or the like) may be used to determine/identify the corresponding event(s) (e.g., in event database 412b).

In some non-limiting embodiments, comprehension system 402b and/or event system 412a may use the keywords (and/or any metadata) to determine (e.g., identify, pinpoint, and/or the like) at least one event (e.g., advertisement campaign/program and/or the like) stored in event database 412b and/or the event organizer (e.g., merchant and/or the like) associated therewith.

In some non-limiting embodiments, if at least one event is determined to be applicable to the user (e.g., customer), comprehension platform 402b may generate a token, as described herein. For example, if at least one event (e.g., offer, advertisement campaign, and/or the like) is applicable, comprehension system 402b may generate a special-purpose (e.g., limited use) token, as described herein, and communicate (e.g., provision and/or the like) the special-purpose token to customer device 406a.

In some non-limiting embodiments, comprehension system 402b (and/or a transaction service provider system such as transaction service provider system 102a) may include logic for identifying user PAN eligibility for an event (e.g., offer, advertisement campaign, and/or the like) as well as logic for generation of the special-purpose token (and/or storage of the mapping associated therewith), as described herein. For example, comprehension system 402a may share the received account identifier (e.g., general-purpose token associated with the first customer associated with customer device 406a) with a transaction service provider system (e.g., transaction service provider system 102a). Additionally or alternatively, the transaction service provider system may include a token vault. In some non-limiting embodiments, the account identifier (e.g., general-purpose token) may be associated with (e.g., mapped to and/or the like) a plurality of PANs in the token vault. Additionally or alternatively, transaction service provider system (e.g., 102a) may determine (e.g., resolve and/or the like) the best eligible PAN (e.g., a PAN associated with a greatest potential reward), as described herein. In some non-limiting embodiments, comprehension system 402b and/or the transaction service provider system (e.g., 102a) may generate a special-purpose token based on the best eligible PAN (e.g., the PAN associated with a greatest potential reward). Additionally or alternatively, comprehension system 402b may communicate (e.g., provision and/or the like) the special-purpose token to customer device 406a (e.g., mobile device, vehicle on-board system, and/or the like) as described herein. In some non-limiting embodiments, comprehension system 402b may not store the PAN (e.g., best eligible PAN), and/or comprehension system 402b may store a mapping from the special-purpose token to the account identifier (e.g., general-purpose token), as described herein.

In some non-limiting embodiments, comprehension system 402b (and/or the transaction service provider system such as transaction service provider system 102a) may use the information received/extracted (e.g., media content data, keyword data, account identifier data, and/or customer device identification data) to determine (e.g., identify and/or the like) at least one PAN eligible for the event (e.g., offer, advertisement campaign, and/or the like) based on event data associated therewith (e.g., applicable BINs, the PAN with greatest potential reward, PAN selected based on user (e.g., customer) preferences/configurations, and/or the like). Additionally or alternatively, comprehension system 402b (and/or the transaction service provider system such as transaction service provider system 102a) may communicate with an issuer system (e.g., issuer system 104) associated with the determined (e.g., identified and/or the like), e.g., over a secure channel.

In some non-limiting embodiments, the device associated with publisher system 406b and/or customer device 406a may present a confirmation (e.g., display a text message, play an audio message, render a confirmation graphic and/or sound, and/or the like) indicating to the user (e.g., customer) that the media content and/or advertisement contained therein has been successfully uploaded to the comprehension system 402b (e.g., that comprehension platform 402b has generated and/or communicated a token associated therewith) and/or the user can take advantage of the event (e.g., redeem an offer associated therewith and/or the like) at a later point of time.

In some non-limiting embodiments, comprehension platform 402b may generate special-purpose tokens and/or communicate (e.g., provision and/or the like) special-purpose tokens to customer device 406a, as described herein. For example, a special-purpose token may be a limited-use, discount-eligible token that may be used to redeem offer benefits and/or to keep track of the advertisements the user is interested in. In some non-limiting embodiments, comprehension platform 402b may only generate and/or communicate special-purpose tokens if predetermined requirements (e.g., conditions and/or the like) are satisfied. For example, such predetermined requirements may include the event organizer (e.g., merchant and/or the like) being registered (e.g., communicating and/or uploading event data associated with at least one event to event database 412b), the user being eligible (e.g., based on the PAN being determined to be eligible (as described herein), based on the user satisfying at least a subset of the redemption requirements associated with the event(s), and/or the like).

In some non-limiting embodiments, comprehension platform 402b may generate special-purpose tokens by masking at least part of the received account identifier (e.g., general-purpose token and/or the like). For example, masking logic may be defined using logic gates (e.g., exclusive-or (XOR), exclusive-nor (XNOR), not-and (NAND), not-or (NOR), any combination thereof, and/or the like). Additionally or alternatively, the masking logic may be applied at the bit-level of the received account identifier (e.g., general-purpose token and/or the like). In some non-limiting embodiments, comprehension platform 402b may preserve the masking logic, masking code, and/or the received account identifier (e.g., general-purpose token and/or the like) corresponding to the generated special-purpose token.

For the purpose of illustration, special-purpose tokens may include one or more custom BINs (which may additionally or alternatively be referred to as Issuer Identification Numbers (IINs)). For example, each BIN may be a number having a predetermined number of digits (e.g., six digits, 8 digits, and/or the like), which may form the first predetermined number of digits (e.g., first six digits, first eight digits, and/or the like) of a special-purpose token (e.g., having a second predetermined number of digits in total, such as 16 digits and/or the like). For the purpose of illustration, assuming a special-purpose token has 16 total digits, the first six digits may be associated with the six-digit BIN (e.g., 432897 and/or the like), and/or the remaining ten digits may range from 0000000000 to 9999999999. In some non-limiting embodiments, the custom BINs allocated for special-purpose tokens may not be used for any other payment device, token, and/or issuer. As such, in some non-limiting embodiments, special-purpose tokens may be identified as special-purpose tokens based on the BINs thereof (and/or may be ensured to not unintentionally match other tokens, payment devices, and/or the like).

In some non-limiting embodiments, the last remaining digits of a special-purpose token (e.g., ten digits (e.g., digits numbered 7-16 following the six-digit custom BIN, which may be associated with digits numbered 1-6)) may be generated by masking the corresponding digits (e.g., digits numbered 7-16) of the received account identifier (e.g., general-purpose token). For the purpose of illustration, Table 1 includes an example for masking the last ten digits of an exemplary general-purpose token. As shown in Table 1, assume a 16-digit general-purpose token (e.g., 4216 2017 9990 2345) is received by comprehension platform 402b. The last ten digits (e.g., 17 9990 2345) of such an exemplary general purpose token may be converted to bits (e.g., four-bit representations) as follows: 0001, 0111, 1001, 1001, 1001, 0000, 0100, 0011, 0100, and 0101. Additionally or alternatively, a masking logic (e.g., XOR and/or the like) may be applied on this using a masking code (e.g., 0010 and/or the like). Thus, a masked representation of the ten-digit number may be given by applying the masking logic (e.g., XOR) and mask code (e.g., 0010) to the converted (e.g., four-bit representations of the) ten digits to form four-bit masked representations and converting the four-bit masked representations back to digits to form a masked representation (e.g., the masked representation of the ten digits may be 19 9988 2347). Additionally or alternatively, this new ten-digit masked representation may be appended to an exemplary custom six-digit BIN (e.g., 432897) to generate a 16-digit special purpose token (e.g., 4328 9719 9988 2347) corresponding to the original general-purpose token. In some non-limiting embodiments, each special-purpose token may be stored at the comprehension system 402b (e.g., in a data storage device thereof).

TABLE 1

| General-Purpose Payment Token | Masking Logic | Masking Code | Special-Purpose Payment Token |
|---|---|---|---|
| 4216 2017 9990 2345 | XOR | 0010 | 4328 9719 9988 2347 |

In some non-limiting embodiments, the remaining digits (e.g., last ten digits of the received account identifier (e.g., general purpose token) other than the BIN) need not be masked. For example, the last ten digits of the received account identifier (e.g., general purpose token) may be appended with the custom BIN (e.g., first six digits of the special-purpose token) to generate a 16-digit special purpose token corresponding to the received account identifier (e.g., general purpose token).

In some non-limiting embodiments, the special-purpose token may be able to expire. For example, after the special-purpose token is used to take advantage of the event (e.g., redeem an offer and/or the like), the special-purpose token may expire so that the user (e.g., customer) may not us the special-purpose token again. Additionally or alternatively, the event data (e.g., redemption requirements of an event such as an advertisement campaign and/or the like) may allow a special-purpose token to be used multiple times (e.g., a selected and/or predetermined number of times), until an expiration date of the event, and/or the like, and the special-purpose token may expire accordingly. In some non-limiting embodiments, the special-purpose token may be usable only at specified locations (e.g., specific merchant locations of a specific merchant and/or the like), e.g., based on the event data (e.g., redemption requirements of an event such as an advertisement campaign and/or the like).

In some non-limiting embodiments, the masking codes and/or the masking logic may be modified (e.g., refreshed, updated, and/or the like) after certain conditions are met. For example, the masking codes and/or the masking logic may be modified after the expiration of a special-purpose token. Additionally or alternatively, the masking codes and/or the masking logic may be modified periodically, at selectable intervals, after a selected number of transactions, and/or the like. In some non-limiting embodiments, comprehension system 402b may enforce security constraints to modify (e.g., refresh and/or the like) the masking logic and/or the masking code (and thereby the resultant special-purpose tokens) as a universal (e.g., umbrella and/or the like) constraint for all special-purpose tokens. Additionally or alternatively, at least some special-purpose tokens may have individual (e.g., configurable, selectable, and/or the like) conditions for modifying the masking logic and/or the masking code (e.g., based on event data (e.g., redemption requirements thereof), merchant category codes, geolocation, expiration data/lifetime, product category to which the event (e.g., offer) applies, product value to which the event (e.g., offer) applies (e.g. more frequent modification/refreshing for higher value products), and/or the like).

In some non-limiting embodiments, each BIN may span millions of possible special-purpose tokens (e.g., $10^{10}$ possible special-purpose tokens). Additionally or alternatively, since making logic and masking code (and therefore special-purpose tokens resulting therefrom) may be periodically modified (e.g., refreshed), the number of possible special-purpose tokens that can be accommodated for each BIN may be further increased over time.

In some non-limiting embodiments, an issuer (e.g., issuer system 104 and/or the like) may request comprehension system 402b to issue a special-purpose token corresponding to a PAN. The issuer (e.g., issuer system 104 and/or the like) may receive the special-purpose token from comprehension system 402b and/or the issuer may communicate (e.g., provision and/or the like) the special-purpose token to an issuer application on customer device 406a (e.g., a mobile device, a vehicle on-board system, and/or the like).

In some non-limiting embodiments, comprehension system 402b may use the location information of customer device 406a (e.g., a mobile device, a vehicle on-board system, and/or the like) to identify a nearest location associated with the offer (e.g., a merchant location (e.g., storefront) of the associated merchant located nearest to customer device 406a), as described herein. For example, comprehension system 402b may use an application programming interface (API) (e.g., Visa® Merchant Locator API and/or the like) to determine the nearest location. Additionally or alternatively, comprehension system 402b may communicate nearest location data associated with the nearest location to customer device 406a (and/or the device associated with publisher system 406b and/or the like). In some non-limiting embodiments, customer device 406a may include a map application. Additionally or alternatively, the nearest location data may be provided to the map application, which may display the nearest location on a map, provide navigation directions to the nearest location, and/or the like.

Figure 5:
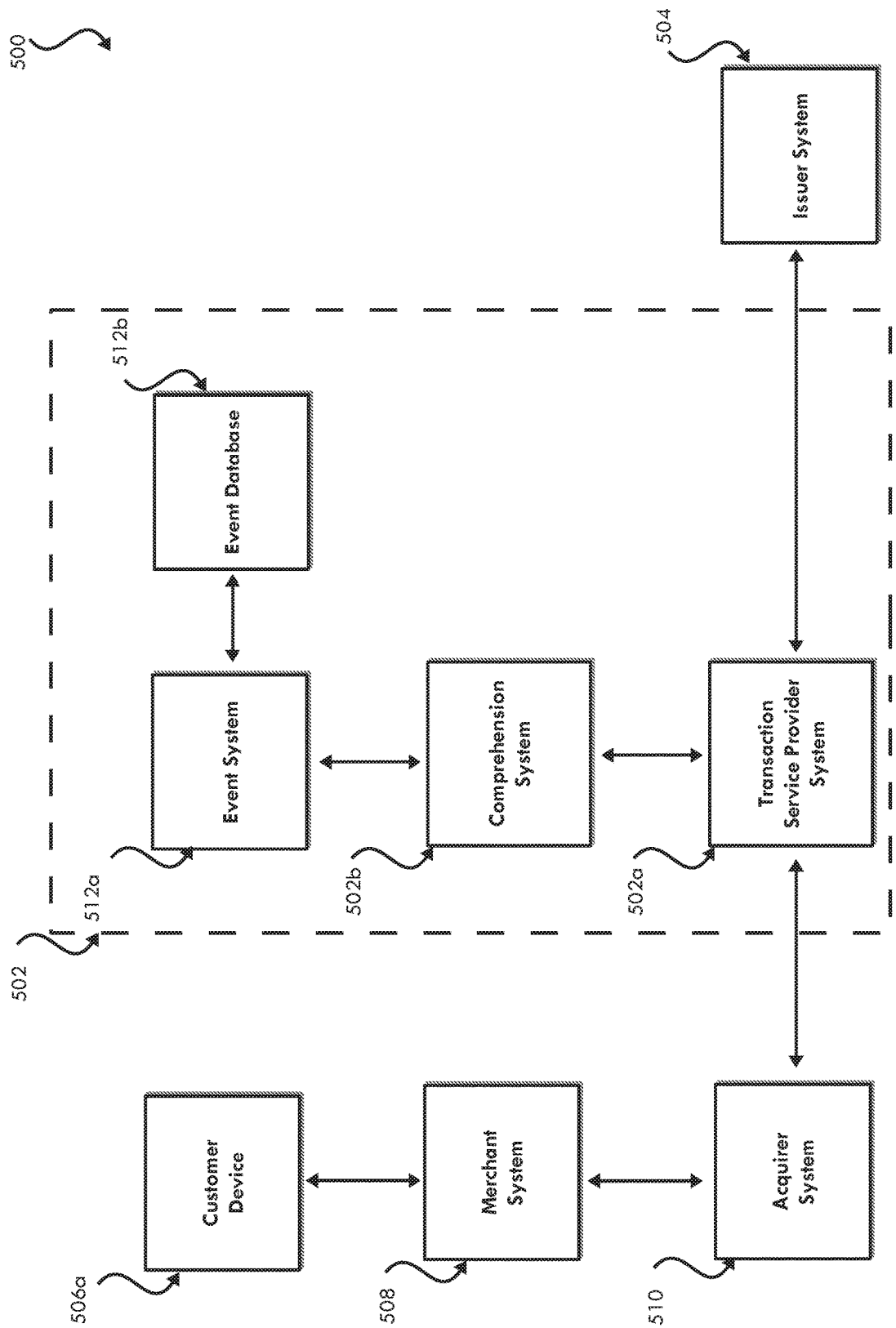
FIG. 5 is a diagram of a non-limiting embodiment of an implementation of a non-limiting embodiment of the process shown in FIG. 3 according to the principles of the presently disclosed subject matter.

Referring now to FIG. 5, FIG. 5 is a diagram of an exemplary implementation 500 of a non-limiting embodiment relating to process 300 shown in FIG. 3. As shown in FIG. 5, implementation 500 may include transaction service provider system 502a, comprehension system 502b, issuer system 504, customer device 506a, merchant system 508, acquirer system 510, event system 512a, and/or event database 512b. In some non-limiting embodiments, transaction service provider system 502a may be the same as or similar to transaction service provider system 102a. In some non-limiting embodiments, comprehension system 502b may be the same as or similar to comprehension system 102b and/or comprehension system 402b. In some non-limiting embodiments, issuer system 504 may be the same as or similar to issuer system 104. In some non-limiting embodiments, customer device 506a may be the same as or similar to customer device 106a and/or customer device 406a. In some non-limiting embodiments, merchant system 508 may be the same as or similar to merchant system 108. In some non-limiting embodiments, acquirer system 510 may be the same as or similar to acquirer system 110. In some non-limiting embodiments, event system 512a may be the same as or similar to event system 112a and/or event system 412a. In some non-limiting embodiments, event database 512b may be the same as or similar to event database 112b and/or event database 412b. In some non-limiting embodiments, any combination of transaction service provider system 502a, comprehension system 502b, event system 512a, and/or event database 512b may be implemented (e.g., completely, partially, and/or the like) by a single system 502.

In some non-limiting embodiments, comprehension system 502b may detect customer device 506a at a location associated with the event(s). For example, comprehension system 502b may receive (e.g., from customer device 506a and/or the like) customer device location data associated with a current location of customer device 506a, as described herein. Additionally or alternatively, customer device 506a may communicate (e.g., via NFC, Bluetooth® Low Energy (BLE), Wi-Fi®, and/or the like) with merchant system 508, which may communicate customer device location data associated with customer device 506a being within communication range of merchant system 508 to comprehension system 502b, as described herein. Additionally or alternatively, customer device 506a may communicate (e.g., via NFC, Bluetooth® Low Energy (BLE), and/or the like) the token (e.g., special-purpose payment token and/or the like) to merchant system 508, which may generate an authorization request including the token and communicate the token to comprehension system 502b, as described herein.

In some non-limiting embodiments, merchant system 508 may receive the token from customer device 506a, as described herein. Additionally or alternatively, comprehension system 502b may receive the token (e.g., directly or indirectly from merchant system 508, customer device 506a, and/or the like), as described herein. For example, merchant system 508 may receive the special-purpose payment token from the customer device 506a. Additionally or alternatively, merchant system 508 may generate an authorization request including the token for a transaction (e.g., first transaction) and/or communicate the authorization request to acquirer system 510, which may communicate the authorization request to transaction service provider system 502a, which may communicate the authorization request (and/or the special-purpose token included therein) to comprehension system 502b.

For the purpose of illustration, the special-purpose token may be used when the user (e.g., customer associated with customer device 506a) takes advantage of the event (e.g., redeems the offer and/or the like) with the merchant (e.g., merchant associated with merchant 508 and/or the like). In some non-limiting embodiments, the user may manually select the special-purpose token (e.g., via input to customer device 506a). In some non-limiting embodiments, customer device 506a may automatically determine whether to user the special-purpose token (e.g., rather than a general-purpose token and/or the like) based on customer device location data associated with customer device 506a, an identity of the merchant (e.g., received via NFC, Bluetooth® Low Energy (BLE), Wi-Fi®, and/or the like from merchant system 508), and/or the like. In some non-limiting embodiments, the user may use special-purpose token for an online/e-commerce purchase (e.g., via a digital wallet application, via manually typing in the special-purpose token, and/or the like).

In some non-limiting embodiments, when the user uses the special-purpose token (as described herein), comprehension system 502b may receive the special-purpose token (as described herein) and automatically take advantage of the event (e.g., redeem the offer and/or the like). Additionally or alternatively, comprehension system 502b may update (e.g., communicate a notification to and/or the like) event system 512a, event database 512b, and/or issuer system 504 based on the use of the special-purpose token. In some non-limiting embodiments, when the user makes a transaction using the special-purpose token, the transaction may be processed seamlessly without significant changes at merchant system 508, acquirer system 510, and/or customer device 506a, since the redemption logic may be stored at and/or processed by comprehension platform 502b, transaction service provider 502a, event system 512a, event database 512b, and/or issuer system 504.

In some non-limiting embodiments, comprehension system 502b may determine the general-purpose payment token based on receiving the special-purpose payment token (e.g., directly or indirectly via an authorization request form merchant system 508 for an online transaction, offline transaction, and/or the like). For example, merchant system 508 may send an authorization request including the special-purpose token to acquirer system 510, which may communicate the authorization request to transaction service provider system 502a, which may communicate the special-purpose token (e.g., from the authorization request) to comprehension platform 502b, which may determine the general-purpose payment token based the mapping of the special-purpose payment token to the general-purpose payment token, as described herein. Additionally or alternatively, comprehension platform 502b may communicate the general-purpose payment token to transaction service provider system 502a, which may determine a PAN (e.g., based on the token vault of transaction service provider system 502a).

In some non-limiting embodiments, comprehension platform 502b may also communicate event data (e.g., redemption requirements, offer benefit, discount amount, and/or the like) to transaction service provider system 502a. In some non-limiting embodiments, transaction service provider system 502a may determine whether the event (e.g., offer and/or the like) is applicable based on transaction details from the authorization request and the event data (e.g., redemption requirements and/or the like). Additionally or alternatively, if the event is applicable, transaction service provider system 502a may apply the benefit of the event (e.g., offer benefit, discount amount, and/or the like) to the transaction (e.g., reduce the transaction amount and/or the like).

In some non-limiting embodiments, transaction service provider system 502a may provide a second authorization request including the PAN (e.g., rather than the special-purpose payment token) to issuer system 504, which may authorize the transaction based on the PAN and the transaction details (e.g., transaction amount (e.g., as reduced by the transaction service provider system 502a based on the event, if applicable) and/or the like) included in the authorization request.

In some non-limiting embodiments, comprehension system 502b may log (e.g., track, store a record of, and/or the like) use/redemption of the special-purpose payment tokens. For example, comprehension system 502b may determine (e.g., based on the number of stored tokens, the number of mappings associated with generated tokens, and/or the like) the number of tokens generated by comprehension system 502b for each respective event. Additionally or alternatively, comprehension system 502b may determine the number of special-purpose tokens redeemed for each respective event (e.g., based on the redemptions of special-purpose tokens logged by comprehension system 502b and/or the like). Additionally or alternatively, comprehension system 502b may determine a conversion rate associated with the special-purpose tokens generated for each respective event (e.g., the number of redeemed special-purpose tokens divided by the number of generated special-purpose tokens, and/or the like).

In some non-limiting embodiments, comprehension system 502b may further log (e.g., track, store a record of, and/or the like) the source (e.g., device associated with publisher system 406b and/or the like) for each special-purpose token (e.g., source of the media content data associated therewith). Additionally or alternatively, comprehension system 502b may track the conversion rate for each source (e.g., the number of redeemed special-purpose tokens divided by the number of generated special-purpose tokens, and/or the like), e.g., as a whole (e.g., for all event organizers), for each event organizer (e.g., each merchant), and/or the like.

In some non-limiting embodiments, comprehension system 502b may further log (e.g., track, store a record of, and/or the like) the metadata associated with each special-purpose token (e.g., source of the media content data associated therewith). Additionally or alternatively, comprehension system 502b may track the conversion rate for each item of metadata (e.g., location, time, and/or the like), e.g., as a whole (e.g., for all event organizers), for each event organizer (e.g., each merchant), and/or the like.

In some non-limiting embodiments, such logging may enable event organizers (e.g., merchants associated with merchant systems 108, 508) and/or publishers (e.g., associated with publisher systems 106b, 406b) to have an improved, more accurate, more detailed, view of how many users are presented with the information about events in media content and/or determining how many users take advantage of (e.g., redeem, benefit from, and/or the like) such events based on the media content.

Although the disclosed subject matter has been described in detail for the purpose of illustration based on what is currently considered to be the most practical and preferred embodiments, it is to be understood that such detail is solely for that purpose and that the disclosed subject matter is not limited to the disclosed embodiments, but, on the contrary, is intended to cover modifications and equivalent arrangements that are within the spirit and scope of the appended claims. For example, it is to be understood that the presently disclosed subject matter contemplates that, to the extent possible, one or more features of any embodiment can be combined with one or more features of any other embodiment.

What is claimed is:

1. A computer-implemented method, comprising:
presenting, with a publisher system comprising at least one computer processor, media content to a first user;
recording, with at least one of a microphone, a camera, or any combination thereof of a first user device comprising a computer processor of the first user separate from the publisher system, media content data from the media content being presented by the publisher system, wherein the media content data comprises at least one of the following: audio data, visual data, or any combination thereof;
receiving, with a comprehension system comprising at least one computer processor remote from the first user device, the media content data from the first user device;
receiving, with the comprehension system, a general-purpose payment token from the first user device, the general-purpose payment token comprising a substitute identifier for a primary account number (PAN) of the first user;
receiving, with the comprehension system, first user device identification data from the first user device, the first user device identification data associated with the first user device of the first user;
extracting, with the comprehension system, keyword data associated with at least one keyword from the media content data;
transmitting, with the comprehension system, the keyword data to an event system comprising at least one computer processor;
determining, with the event system, at least one event from a plurality of events stored in an event database based at least partially on the keyword data;
transmitting, with the event system, event data associated with the at least one event to the comprehension system;
generating, with the comprehension system, a special-purpose payment token based at least partially on the event data and the general-purpose payment token;
transmitting, with the comprehension system, the special-purpose payment token to the first user device based at least partially on the first user device identification data;
transmitting, with the first user device, the special-purpose payment token to a merchant system comprising at least one computer processor at a location associated with the at least one event via near-field communication (NFC) based on being within communication range of the merchant system, wherein the merchant system generates an authorization request comprising the special-purpose payment token for a first transaction based on receiving the special-purpose payment token from the first user device;
receiving, with a transaction service provider system comprising at least one computer processor, the authorization request comprising the special-purpose payment token from the merchant system;
transmitting, with the transaction service provider system, the authorization request comprising the special-purpose payment token to the comprehension system;
detecting, with the comprehension system, the first user device at the location associated with the at least one event based on receiving the authorization request comprising the special-purpose payment token;
determining, with the comprehension system, the general-purpose payment token based on the special-purpose payment token;
transmitting, with the comprehension system, the general-purpose payment token to the transaction service provider system;
determining, with the transaction service provider system, the PAN based on the general-purpose token; and
transmitting, with the transaction service provider system, a second authorization request based on the PAN to an issuer system.

2. The method of claim 1, wherein the media content data further comprises metadata associated with at least one of a time or a location of the media content, and wherein determining the at least one event comprises determining, with the event system, the at least one event from the plurality of events stored in the event database based at least partially on the keyword data and the metadata.

3. The method of claim 1, wherein the at least one keyword comprises at least one of the following: an offer term, a participating merchant, a participating issuer, an eligible account type, or any combination thereof.

4. The method of claim 1, wherein the media content data comprises audio data, and wherein extracting the keyword data comprises:
extracting, with the comprehension system, word data associated with at least one word from the media content data using at least one of speech recognition or natural language processing; and
determining, with the comprehension system, the at least one keyword based at least partially on the at least one word extracted from the media content data.

5. The method of claim 1, wherein the media content comprises at least one command, the method further comprising:
detecting, with the first user device, the at least one command based on the media content,
wherein recording comprises recording the media content data from the media content for a first time period after detecting the command and wherein
the first user device transmits the media content data to the comprehension system.

6. The method of claim 1, further comprising:
determining, with the comprehension system, the PAN of the first user based on the general-purpose payment token,
wherein generating the special-purpose payment token comprises generating, with the comprehension system, the special-purpose payment token based at least partially on the at least one event and the PAN.

7. The method of claim 1, wherein the first user device comprises at least one of the following: a mobile device, a vehicle on-board system, or any combination thereof.

8. The method of claim 1, further comprising:
receiving, with the comprehension system, first user device location data associated with a current location of the first user device;
determining, with the comprehension system, a nearest location associated with the at least one event based at least partially on the first user device location; and
transmitting, with the comprehension system, nearest location data associated with the nearest location associated with the at least one event to the first user device.

9. The method of claim 1, further comprising:
receiving, with the comprehension system, a request to share event data associated with the at least one event with a second user;
receiving, with the comprehension system, account identifier data associated with an account identifier of the second user;
receiving, with the comprehension system, second user device identification data associated with a second user device of the second user;
generating, with the comprehension system, a second special-purpose payment token based on the event data and the account identifier data; and
transmitting, with the comprehension system, the second special-purpose payment token to the second user device based at least partially on the second user device identification data.

10. The method of claim 1, further comprising:
determining, with the comprehension system, a plurality of PANs associated with the general-purpose payment token;
determining, with the comprehension system, a potential reward associated with each PAN of the plurality of PANs; and
selecting, with the comprehension system, a selected PAN of the plurality of PANs corresponding to a greatest potential reward, wherein the PAN comprises the selected PAN,
wherein generating the special-purpose payment token comprises generating, with the comprehension system, the special-purpose payment token based on the at least one event and the PAN of the plurality of PANs corresponding to the greatest potential reward.

11. The method of claim 1, wherein the general-purpose payment token comprises a first set of digits having a predetermined number of digits, the first set of digits comprising a first bank identification number (BIN) comprising a subset of the first set of digits, and wherein the special-purpose payment token comprises a second set of digits having the predetermined number of digits, the second set of digits comprising a second BIN comprising a subset of the second set of digits, the second BIN being different than the first BIN.

12. The method of claim 11, wherein the first set of digits comprises a first set of remaining digits other than the first BIN and the second set of digits comprises a second set of remaining digits other than the second BIN, the method further comprising:
determining, with the comprehension system, the second set of remaining digits by masking the first set of remaining digits.

13. The method of claim 12, wherein masking the first set of remaining digits comprises:
determining, with the comprehension system, a four-bit representation for each digit of the first set of remaining digits;
determining, with the comprehension system, a four-bit masked representation for each digit of the first set of remaining digits by combining the four-bit representation with a code using at least one logic gate; and
determining, with the comprehension system, the second set of remaining digits based on the four-bit masked representation for each digit of the first set of remaining digits.

14. The method of claim 1, further comprising:
determining, by the transaction service provider system, that the at least one event is applicable to the first transaction based on the authorization request and the event data; and
applying, by the transaction service provider system, a benefit of the at least one event to the first transaction based on the determining that the at least one event is applicable to the first transaction.

15. The method of claim 14, wherein applying the benefit comprises reducing a transaction amount of the first transaction.

16. A system, comprising:
a publisher system comprising at least one computer processor configured to present media content to a first user;
at least one user device comprising a computer processor of the first user separate from the publisher system and configured to:
record, with at least one of a microphone, a camera, or any combination thereof, media content data from the media content being presented by the publisher system, wherein the media content data comprises at least one of the following: audio data, visual data, or any combination thereof; and
transmit the media content data, a general-purpose payment token comprising a substitute identifier for a primary account number (PAN) first user, and first user device identification data associated with a first user device of the at least one user device;
a comprehension system comprising at least one computer processor configured to:
receive the media content data, the general-purpose payment token, and the first user device identification data;
extract keyword data associated with at least one keyword from the media content data; and
transmit the keyword data;
an event system comprising at least one computer processor configured to:
receive the keyword data from the comprehension system;
determine at least one event from a plurality of events stored in an event database based at least partially on the keyword data; and
transmit event data associated with the at least one event to the comprehension system;
wherein the comprehension system is further configured to:
generate a special-purpose payment token based at least partially on the event data and the general-purpose payment token; and transmit the special-purpose payment token to the first user device based at least partially on the first user device identification data, wherein the at least one user device is further configured to transmit the special-purpose payment token to a merchant system comprising at least one computer processor at a location associated with the at least one event via near-field communication (NFC) based on being within communication range of the merchant system, wherein the merchant system is configured to generate an authorization request comprising the special-purpose payment token for a first transaction based on receiving the special-purpose payment token from the first user device;

a transaction service provider system comprising at least one computer processor configured to:
receive the authorization request comprising the special-purpose payment token from the merchant system; and
transmit the authorization request comprising the special-purpose payment token to the comprehension system;

wherein the comprehension system is further configured to:
detect the first user device at the location associated with the at least one event based on receiving the authorization request comprising the special-purpose payment token;
determine the general-purpose payment token based on the special-purpose payment token; and
transmit the general-purpose payment token to the transaction service provider system;

wherein the transaction service provider system is further configured to:
determine the PAN based on the general-purpose token; and
transmit a second authorization request based on the PAN to an issuer system.

* * * * *